United States Patent [19]

Wichter et al.

[11] Patent Number: 5,608,643
[45] Date of Patent: Mar. 4, 1997

[54] SYSTEM FOR MANAGING MULTIPLE DISPENSING UNITS AND METHOD OF OPERATION

[75] Inventors: Martin A. Wichter, Arlington; Tom R. Pohrte; Jack A. Ross, both of The Colony; Ray G. Sadler, Plano, all of Tex.

[73] Assignee: General Programming Holdings, Inc., Dallas, Tex.

[21] Appl. No.: 300,483

[22] Filed: Sep. 1, 1994

[51] Int. Cl.$^6$ ................................................ G06F 17/00
[52] U.S. Cl. .......................... 364/479.14; 364/479.11; 364/479.12; 221/9
[58] Field of Search ............... 364/478, 478.01–479.14; 194/217; 221/9; 340/825.35

[56]  References Cited

U.S. PATENT DOCUMENTS

| | | | |
|---|---|---|---|
| 4,241,237 | 12/1980 | Paraskevakos et al. | |
| 4,412,292 | 10/1983 | Sedam et al. | 364/479 |
| 4,766,548 | 8/1988 | Cedrone et al. | 364/479 |
| 4,999,763 | 3/1991 | Ousborne | 364/478 |
| 5,029,098 | 7/1991 | Levasseur | 364/479 |
| 5,091,713 | 2/1992 | Horne et al. | 364/479 |
| 5,282,127 | 1/1994 | Mii | 364/479 |

OTHER PUBLICATIONS

Wichter, Martin A., Declaration of, including Exhibit; brochure, "*Vending-Manager*™", copyright 1992.

*Primary Examiner*—Roy N. Envall, Jr.
*Assistant Examiner*—Steven R. Garland
*Attorney, Agent, or Firm*—Baker & Botts, L.L.P.

[57] ABSTRACT

A system (8) for managing multiple dispensing units by communicating information through a communications network (12) is provided. The system includes a plurality of dispensing units (10) operable to transmit and receive information through the network. Each dispensing unit includes a plurality of bins (20) operable to hold a quantity of product. Each dispensing unit includes a plurality of reference level sensors (72) where each reference level sensor is coupled to an associated bin. Each reference level sensor is operable to determine when the quantity of product in the associated bin drops below a reference level (76) that is higher than an out of stock level (82) of the associated bin. Each dispensing unit includes a controller subsystem (34) coupled to the plurality of bins, to the plurality of reference level sensors, and to the network. The controller subsystem is operable to monitor conditions of the dispensing unit, to transmit status messages responsive to an occurrence of one of a plurality of defined events, and to receive command messages. The system further includes a dispensing unit controller system (14) operable to communicate through the network. The dispensing unit controller system is operable to receive status messages from each of the dispensing units, to process the status messages, and to transmit command messages to each of the dispensing units. One command message can be an instruction to a dispensing unit to download a software module to update an existing software module in the controller subsystem of the dispensing unit.

24 Claims, 9 Drawing Sheets

5,608,643

SYSTEM FOR MANAGING MULTIPLE DISPENSING UNITS AND METHOD OF OPERATION

BACKGROUND OF THE INVENTION

Dispensing units are widely utilized to sell products to consumers. Dispensing units include any device for holding products from which a consumer can take products for purchase. Vending machines are a common type of dispensing unit and are used to sell a wide range of products, including soft drinks and food. Vending machines generally operate as stand-alone retail devices and are stocked with products by route drivers who also collect money from the vending machines.

A dispensing unit generally includes one or more bins that hold product for sale to the consuming public. These bins might hold any number of products. Some dispensing units, such as vending machines, operate alone to collect money from the consumer and dispense product from a selected bin, such as a rack of soft drinks in a convenience store.

Managing dispensing units to ensure proper function, maintain adequate product supply and earn a profit presents a number of problems. These problems are magnified where the dispensing units operate as stand-alone units because the dispensing units are unsupervised except during servicing. One problem associated with dispensing units is maintaining an adequate supply of product in the dispensing unit. Additional problems include mechanical failures, vandalism and other events causing the dispensing units to operate improperly. Further problems are the equipment and labor costs involved in servicing dispensing units, and reconciliation of the money collected by route drivers with the quantity of product sold from the dispensing units. Because of these and other problems, the task of managing dispensing units is quite difficult.

Several conventional systems provide remote monitoring of sensors. One conventional system is disclosed in U.S. Pat. No. 4,412,292 The system described in this patent allows vending machines to generate and transmit an alarm signal to a central computer complex indicating an illegal entry into a vending machine or an improper dispensing of change. This system also indicates when a "sold-out" or "jam" condition exists. The system disclosed in this patent reports data on a prescheduled call-in basis except for the several alarm conditions.

A second conventional system is disclosed in U.S. Pat. No. 4,241,237. The system of this patent monitors remote sensors for reading a meter. This system utilizes a remote unit attached to a meter that contacts a central computer at a preselected time or in the event of an alarm condition to transmit information relevant to reading the meter.

These conventional remote monitoring systems are limited. Changes in sensed conditions occurring between preselected or prescheduled intervals are not addressed. Further, there is no capability to transfer information from a central facility to a remote unit, there is insufficient information gathered, and there is underutilization of information.

A need has arisen for a system for managing multiple dispensing units that more efficiently acquires and utilizes information to address problems associated with managing dispensing units.

SUMMARY OF THE INVENTION

According to the present invention, a system for managing multiple dispensing units and method of operation is provided that substantially eliminates or reduces problems and disadvantages of managing dispensing units and of conventional remote sensor monitoring systems.

According to one embodiment of the present invention, a system for managing multiple dispensing units by communicating information through a communications network is provided. The system for managing multiple dispensing units includes a plurality of dispensing units operable to transmit and receive information through the communications network. Each dispensing unit includes a plurality of bins operable to hold a quantity of product. Each dispensing unit includes a plurality of reference level sensors where each reference level sensor is coupled to an associated bin. Each reference level sensor is operable to determine when the quantity of product in the associated bin drops below a reference level that is higher than an out of stock level of the associated bin. Each dispensing unit also includes a controller subsystem coupled to the plurality of bins, to the plurality of reference level sensors and to the communications network. The controller subsystem is operable to monitor conditions of the dispensing unit, to transmit status messages responsive to an occurrence of one of a plurality of defined events, and to receive command messages. The system for managing multiple dispensing units may further include a dispensing unit controller system operable to communicate through the communications network. The dispensing unit controller system is operable to receive status messages from each of the plurality of dispensing units, to process the status messages, and to transmit command messages to each of the plurality of dispensing units. One command message can be an instruction to a dispensing unit to download a software module to update an existing software module in the controller subsystem of the dispensing unit.

BRIEF DESCRIPTION OF THE DRAWINGS

A more complete understanding of the advantages of the present invention may be acquired by referring to the drawings wherein like reference numbers indicate like features and wherein.

DETAILED DESCRIPTION OF THE INVENTION

Introduction and Overview

A system for managing multiple dispensing units constructed according to the teaching of the present invention significantly increases the efficiency of managing the dispensing units, thereby increasing the operation time and sales volume of dispensing units. The system for managing multiple dispensing units of the present invention acquires and utilizes real-time information describing the status of each dispensing unit managed by the system. The system acquires information describing such conditions as product inventory by bin, unauthorized access, refrigerator temperature, out of change, power off, and a period of no activity.

According to the teachings of the present invention, all information acquisition is event driven. In general, the dispensing units communicate with a dispensing unit controller system utilizing an appropriate communications network. The relevant status and condition of each dispensing unit is transmitted by the dispensing unit to the dispensing unit controller system when specific reporting events occur. For example, if there has been no activity for a specified period of time, or product temperature is out of predetermined range, a dispensing unit senses this event and transmits information describing these events. The dispensing unit controller system utilizes the transmitted information to ensure appropriate actions are taken to address the event that has occurred.

A system for controlling multiple dispensing units constructed according to the teaching of the present invention acquires information as to a number of useful conditions of each dispensing unit. The system utilizes this information about the dispensing units efficiently to manage the dispensing units. This information is stored by the dispensing unit controller system and is utilized to generate reports and accurate orders for stocking the dispensing units and to schedule product delivery and maintenance trucks.

Description of the System

Figure 1:
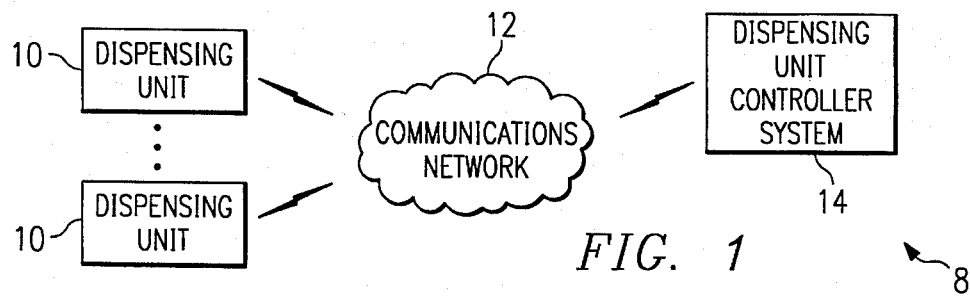
FIG. 1 is a block diagram of a system for managing multiple dispensing units constructed according to the teachings of the present invention.

FIG. 1 illustrates a block diagram of a system for managing multiple dispensing units, indicated generally at 8, constructed according to the teachings of the present invention. System 8 includes a plurality of dispensing units 10. Each dispensing unit 10 communicates information through a communications network 12 to a dispensing unit controller system 14.

In operation, dispensing unit 10 transmits information to and receives information from dispensing unit controller system 14 through communications network 12. Similarly, dispensing unit controller system 14 transmits information to and receives information from dispensing unit 10. Communications network 12 comprises an appropriate communications medium that may comprise, for example, a cellular radio network, a wide area radio frequency network, or a satellite network. In one embodiment of the present invention, a plurality of dispensing units 10 are arranged in groups and located at various sites all of which communicate across a wide area radio frequency network with dispensing unit controller system 14 utilizing radio frequency modems and antennas.

According to the teachings of the present invention, each dispensing unit 10 operates in an event-driven mode. Each dispensing unit 10 monitors the status of various conditions relevant to its operation. Each dispensing unit 10 then transmits information to dispensing unit controller system 14 as triggered by the occurrence of defined events. Dispensing unit controller system 14 receives and processes the information transmitted by each dispensing unit 10. Dispensing unit controller system 14 also operates to transmit control information to each dispensing unit 10, such as a request for current status message or program data to be downloaded into dispensing unit 10.

In one embodiment of the present invention, communications network 12 comprises a wide-area radio frequency network allowing real-time communication between dispensing unit controller system 14 and each dispensing unit 10. Transmissions of information occur in either direction between dispensing units 10 and dispensing unit controller system 14.

Information is transmitted as discrete messages. Dispensing units 10 utilize a common data format for messages transmitted to dispensing unit controller system 14. Dispensing unit controller system 14 utilizes different data formats for messages to dispensing units 10 depending upon the purpose of the message and the specific characteristics of the dispensing unit 10 receiving the message.

The communication interface for each dispensing unit 10 and for dispensing unit controller system 14 comprises a communications manager and a communications driver in one embodiment of the present invention. The communication interface for dispensing unit controller system 14 further includes a database driver. Each communications manager operates to control the traffic of messages between the dispensing units 10 and dispensing unit controller 14. Each communications manager receives all outgoing messages and provides the outgoing messages to the communications driver. The communications manager for the dispensing unit controller system 14 also translates high-level requests into messages to supply to the communications driver. The communications driver operates to translate data formats between communications network 12 and the computer environment in which the communication interface is operating. The communications driver is divided into two parts: the first handles data formats of communication network 12 and the second handles data formats of the computer environment. The two parts can be mixed and matched as needed for different environments. The communications driver interfaces with the communications manager and communications network 12 to allow transfer of messages.

In dispensing unit controller system 14, the database driver operates to move messages into and out of a database. In general, the database driver receives incoming messages from the communications manager and places them in a database communication log. The database driver also scans the communication log for outgoing messages to pass back to the communications manager. The database driver operates as an interface between the communications manager and the processing functions of dispensing unit controller system 14 that utilize the information from messages in the database. According to the teachings of the present invention, all messages received or transmitted by dispensing unit controller system 14 are passed to the communications manager through a communication log in a database. This aspect of dispensing unit controller system 14 is described in more detail with respect to FIG. 3.

Dispensing Units

Figure 2:
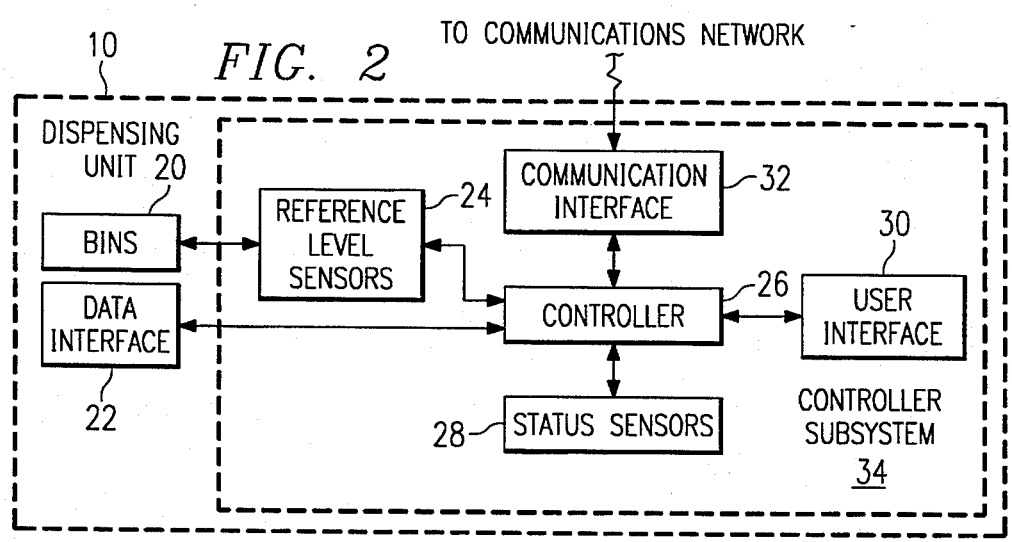
FIG. 2 is a block diagram of a dispensing unit constructed according to the teachings of the present invention.

FIG. 2 illustrates a block diagram of a dispensing unit 10 constructed according to the teachings of the present invention. Dispensing unit 10 includes a number of bins 20 and a data interface 22. Reference level sensors 24 are coupled to bins 20. A controller 26 is coupled to data interface 22 and to reference level sensors 24. Status sensors 28 are coupled to controller 26. A user interface 30 and a communication interface 32 are coupled to controller 26 as shown. Communication interface 32 is coupled to communications network 12 shown in FIG. 1. Controller 26, reference level sensors 24, status sensors 28, user interface 30, and communication interface 32 comprise a controller subsystem 34.

Dispensing unit 10 operates to sell products to the consuming public and to collect money for such products. In one embodiment of the present invention, dispensing unit 10 comprises a soft drink vending machine. However, the teachings of the present invention apply equally to other types of dispensing units. Each bin 20 holds a quantity of a specific product, and dispensing unit 10 operates to allow a consumer to select a product from a bin 20. The consumer pays for the selected product, and dispensing unit 10 dispenses the product to the consumer. Each bin 20 contains independent quantities of product and is independently monitored.

Data interface 22 is not a feature of all types of dispensing units, but is a feature of some conventional dispensing units. Data interface 22 is coupled to the physical subsystem of dispensing unit 10 and monitors physical features of dispensing unit 10. Some dispensing units 10 have a data interface 22 comprising a sophisticated electronic coin mechanism, or other electronic means, that keeps a sales history in addition to counting sales by each bin 20. In this case, data interface 22 of dispensing unit 10 is operable to provide this information. Where data interface 22 exists, controller 26 interfaces with data interface 22 to acquire information. In one embodiment of the present invention, data interface 22 comprises a DEX/UCS port.

Reference level sensors 24 operate to sense the quantity of product in each bin 20 and to transmit this information to controller 26. In one embodiment of the present invention, reference level sensors 24 operate to determine when the quantity of product in each bin 20 is at a reference level and when each bin 20 is out of stock.

Status sensors 28 are coupled to the physical subsystem of dispensing unit 10 and monitor conditions throughout dispensing unit 10. Status sensors 28 transmit information indicating the status of these conditions to controller 26. Status sensors 28 monitor such conditions as temperature, power level, back-up power level, and a vending of product from a bin 20. Other conditions monitored by status sensors 28 are whether a door to dispensing unit 10 is open or closed, whether dispensing unit 10 is being serviced, and whether dispensing unit 10 is in an exact change state.

Controller 26 operates to control the operation of controller subsystem 34 and to control the participation of dispensing unit 10 in system 8 of FIG. 1. Controller 26 receives information transmitted by reference level sensors 24 and status sensors 28. Controller 26 maintains the current status of the condition of dispensing unit 10 and the current quantity of product in bins 20. Controller 26 also operates to interface with data interface 22 to monitor those features of dispensing unit 10 monitored by data interface 22. In an alternate embodiment of the present invention, dispensing unit 10 does not include data interface 22. In this embodiment, status sensors 28 are coupled to the physical subsystem of dispensing unit 10 to monitor those features otherwise monitored by data interface 22.

User interface 30 operates to allow direct data communication with controller 26. When dispensing unit 10 is being serviced, a user, such as a route driver, may communicate with controller 26 utilizing user interface 30. This provides a user with an ability directly to supply information to controller 26. In one embodiment of the present invention, user interface 30 operates to provide information as to the name, price, and quantity of product stocked in bins 20. User interface 30 may comprise, for example, such devices as a light wand, a key pad, a display device, or a scanner. In alternate embodiments of the present invention, dispensing unit 10 does not include user interface 30.

Communication interface 32 operates to receive messages transmitted from and to transmit messages to dispensing unit controller system 14 through communications network 12. Communications interface 32 receives messages and provides information to controller 26. Controller 26 provides outgoing messages to communication interface 32 for transmission to dispensing unit controller system 14. In this manner, dispensing unit 10 is linked into system 8 of FIG. 1.

Retrofit Kit

Controller subsystem 34 can comprise a retrofit kit modification package installable in a conventional dispensing unit. Many conventional dispensing units presently exist that comprise only bins and a physical subsystem operable to allow consumers to buy products from bins. Some conventional dispensing units also include a data interface as shown in FIG. 2. However, conventional dispensing units presently serving the public do not include an ability to monitor the conditions of the dispensing unit according to the teachings of the present invention.

A retrofit kit can be installed in a conventional dispensing unit to enable the dispensing unit to communicate with dispensing unit controller system 14 and to allow managing of the dispensing unit. A retrofit kit comprises all of the elements of controller subsystem 34. During installation, reference level sensors 24 are coupled to bins 20 of dispensing unit 10, controller 26 is coupled to data interface 22 if dispensing unit 10 includes data interface 22, and status sensors 28 are coupled to dispensing unit 10 to monitor conditions not monitored through data interface 22. In this manner, conventional dispensing units can be upgraded to be operable within a system for managing multiple dispensing units according to the teachings of the present invention.

Communication of Messages

Message transmission is event-driven including responses to status request messages transmitted by dispensing unit controller system 14. Controller 26 operates to transmit messages to dispensing unit controller system 14 upon the occurrence of specified events. When information acquired as to the condition of dispensing unit 10 indicates an event has occurred, controller 26 transmits a status message through communication interface 32 to dispensing unit controller system 14. In one embodiment of the present invention, controller 26 transmits a status message in response to a power loss, a restoration of power, a temperature that is too high or too low, an open door of dispensing unit 10, an unauthorized access to dispensing unit 10, and when dispensing unit 10 is accepting exact change only. Additionally in this embodiment, controller 26 transmits a status message when the back-up power supply is low and when a maximum no-activity time is reached, indicating a possible jam. Controller 26 may also transmit a status message when there has been a system initialization failure, a general system failure, or a cold-start.

In order to maintain an accurate inventory of the products in bins 20, controller 26 monitors vending activity and transmits an inventory status message to dispensing unit controller system 14 when an inventory threshold is crossed with respect to anyone of bins 20. Controller 26 maintains a current count as to the quantity of product sold from each of the bins 20. Reference level sensors 24 provide controller 26 with an indication as to when the quantity of product in each of the bins 20 reach a given reference level and as to when the quantity is out of stock. Controller 26 utilizes these reference points to calculate the quantity of product in each bin 20 after restocking and to maintain a count as to the current quantity of product. Controller 26 transmits a message when a reference point has been crossed including inventory information, the time, and the date of the occurrence.

In addition to the reference points provided by reference level sensors 24, other threshold reference points can be programmed into controller 26. In one embodiment of the present invention, two additional reference points are programmed into controller 26 to give a maximum reorder level and a minimum reorder level. In this embodiment of the present invention, each bin includes four reference points, a reference level, a maximum reorder level, a minimum reorder level, and an out-of-stock level. This embodiment is described in more detail with respect to FIG. 4. Controller 26 transmits a message at the occurrence of a bin passing any threshold reference point. The various reference points programmed into controller 26 can be set as appropriate for determining when dispensing unit 10 should be restocked.

Controller 26 receives and responds to status request messages from dispensing unit controller system 14. Controller 26 also can store downloaded control and threshold parameters transmitted from dispensing unit controller system 14. Controller 26 monitors conditions in dispensing unit 10 through reference level sensors 24, data interface 22, and status sensors 28 by comparing the conditions to threshold levels held by controller 26. When a threshold is exceeded, controller 26 transmits a status message to dispensing unit controller system 14 identifying the event that has occurred. Controller 26 also utilizes information acquired as to the condition of dispensing unit 10 to respond appropriately to status request messages from dispensing unit controller system 14. Controller 26 stores downloaded control and threshold parameters, tracks current activity for use in internal processing, and tracks and stores sales per bin per unit of time for transmission to dispensing unit controller system 14.

Dispensing unit 10 operates in system 8 of FIG. 1 to transmit a message to dispensing unit controller system 14 upon the occurrence of a number of defined events. The messages provide information describing the defined event that has occurred. In one embodiment of the present invention, defined events include: system initialization failure, system failure, cold-start, power loss, power restored, door open but machine not in service, and door closed. Additional defined events include: the quantity of product in a bin crossing a reference point, temperature too high, temperature too low, exact-change only condition, inactivity for a period equal to a maximum no-activity time, real time clock battery low, and back-up battery low.

Dispensing unit 10 also operates in system 8 of FIG. 1 to collect and transmit to dispensing unit controller system 14 the sales per bin per unit of time. This information can be utilized to analyze and improve machine sales performance in areas such as machine placement, restocking schedules, and product placement per bin. Dispensing unit 10 further operates in system 8 of FIG. 1 to respond to a status request message received from dispensing unit controller system 14. Dispensing unit 10 transmits a message in response, providing information as to the status of all monitored machine functions and a complete machine inventory.

Message Data Format

In one embodiment of the present invention, all messages transmitted and received by dispensing unit 10 are in an ASCII data format. Each message transmitted by dispensing unit 10 contains the software system and version identification of dispensing unit 10. Dispensing unit controller system 14 uses this information to determine the data format of outgoing messages to format incoming messages, and to control implementation of software updates. This information is also used to decide whether dispensing unit controller system 14 should transmit a new software module to be downloaded into controller 26 of dispensing unit 10.

Each message also includes a dispensing unit identification code and a reason code. The identification code is unique to each dispensing unit 10, and the reason code identifies the defined event that has occurred to cause transmission of a message. Messages further include a communications retry count that indicates the number of times dispensing unit 10 has tried to transmit this message. Each message further includes machine status codes indicating the status of all monitored features of dispensing unit 10. Each message also includes the current temperature of dispensing unit 10 or indicates that dispensing unit 10 does not monitor its temperature. Finally, each message indicates the number of bins, bin information as to quantity of product, and bin sales per unit of time for each bin. Of course, the scope of the present invention is not limited to messages having the described format.

Messages transmitted by dispensing unit controller system 14 to a dispensing unit 10 have different formats depending upon the purpose of the message and the characteristics of dispensing unit 10. In this embodiment of the present invention, each message is in an ASCII data format and begins with a command field. The format of the remaining parts of the message record is unique for each message. Message commands include system reset, system initialization, bin initialization, status request, time initialization, and software initialization.

Each message transmitted by dispensing unit controller system 14 instructs dispensing unit 10 to execute a command. A system reset message instructs dispensing unit 10 to execute a cold-start. A system initialization message instructs dispensing unit 10 to reset all parameters of defined events that are controlled by dispensing unit controller system 14. The parameters control the threshold of defined events that trigger a message to be sent from dispensing unit 10. Parameters include: current time and date, no-activity time out, door open time out, monitor temperature control, maximum temperature, minimum temperature, temperature re-check interval, coin changer type, communications re-try count, additional low inventory message control, sales history control, and number of bins. A bin initialization message instructs dispensing unit 10 to reset all dispensing unit controller system 14 controlled parameters with respect to the quantity of product in bins 20. These parameters include such things as a reference line, a maximum re-order level, and a minimum re-order level.

A status request message is a request for the current status and inventory of dispensing unit 10. Dispensing unit 10 responds by transmitting a status message to dispensing unit controller system 14. A time initialization message instructs dispensing unit 10 to reset the date and time in controller 26 of dispensing unit 10. This message provides the current time and date. A software initialization message is utilized by dispensing unit controller system 14 to transmit and download software modules into controller 26 of dispensing unit 10. The message includes a module block containing the single block of software that is to be downloaded. Of course, the scope of the present invention is not limited to the described message commands.

Dispensing Unit Controller System

Figure 3:
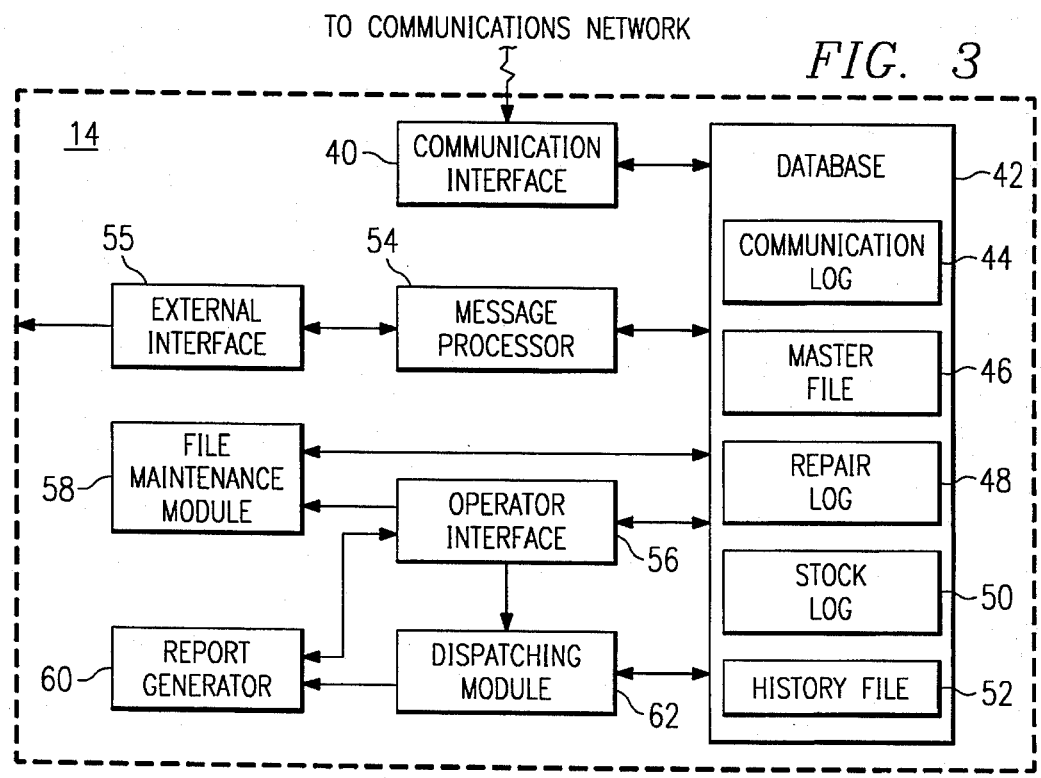
FIG. 3 is a block diagram of a dispensing unit controller system constructed according to the teachings of the present invention.

FIG. 3 illustrates a block diagram of dispensing unit controller system 14 constructed according to the teachings of the present invention. Dispensing unit controller system 14 includes a communication interface 40 coupled to communications network 12. Communication interface 40 is coupled to a database 42. Database 42 includes a number of database files, including a communication log 44, a master file 46, a repair log 48, a stock log 50, and a history file 52. A message processor 54 also is coupled to database 42. An external interface 55 is coupled to message processor 55, as shown. An operator interface 56 is coupled to database 42, to a file maintenance module 58 and a report generator 60. File maintenance module 58 is also coupled to database 42. Operator interface 56 is coupled to a dispatching module 62. Dispatching module 62 is coupled to database 42 and to report generator 60, as shown.

Dispensing unit controller system 14 operates in a computer environment on a computer hardware system located at a central location to manage a number of dispensing units 10 according to the teachings of the present invention. In one embodiment of the present invention, dispensing unit controller system 14 is an application developed in the Progress 4GL language operating with a Progress 4GL database. This embodiment runs in either a DOS Novell local area network or a UNIX environment. In this embodiment, dispensing unit controller system 14 utilizes a Progress 4GL based menuing and security system available from General Programming, Inc., in Dallas, Tex., that provides security, log-on and menuing functions. In this embodiment, dispensing unit controller system 14 utilizes pull down menus, pop-up screens, scroll and choose screens and dialogue boxes to provide a user-friendly environment.

Communication interface 40 interfaces with communications network 12, and communication log 44 in database 42. Communication interface 40 includes two parts: an interface to communications network 12 and an interface to database 42. The interface to communications network 12 operates to transmit and receive messages through communications network 12 utilizing a network data format. The interface to communications network 12 then provides information to the interface to database 42. The interface to database 42 stores and retrieves messages in a database format in communication log 44. All incoming and outgoing messages to dispensing unit controller system 14 are handled in this manner. In one embodiment of the present invention, communications interface 40 includes a communication driver, a communication manager and a database driver as described above with reference to FIG. 1.

Message processor 54 operates to execute the bulk of the functions performed by dispensing unit controller system 14. Message processor 54 includes an incoming interface and outgoing interface to communication log 44. The incoming interface operates to retrieve from communication log 44 any messages transmitted by a dispensing unit 10. The outgoing interface operates to store messages in communication log 44 for transmission to a dispensing unit 10. Message processor 54 also includes a database maintenance module operable to change parameters within the database files in database 42. Message processor 54 further includes an order generation module operable automatically to schedule servicing visits by route drivers and to schedule what equipment and parts need to be taken to service each dispensing unit 10. Message processor 54 prepares orders for products to stock dispensing units 10 and prepares orders for repair of dispensing units 10. Message processor 54 maintains entries in repair log 48 and stock log 50 to indicate scheduled repair and stocking service visits, respectively. External interface 55 provides access to information management system, external to dispensing unit controller system 14.

Operator interface 56 provides a direct user interface for a user of dispensing unit controller system 14. Operator interface 56 allows a user to provide information to and receive information from dispensing unit controller system 14. Operator interface 56 is coupled to file maintenance module 58 to allow a user to execute file maintenance tasks. Operator interface 56 is coupled to report generator 60 to allow a user to invoke report generator 60 to generate desired reports. Finally, operator interface 56 is coupled to dispatching module 62 to allow a user to invoke dispatching module 62 to generate restocking and repair dispatches.

File maintenance module 58 provides maintenance of the database files and other information in database 42. File maintenance module 58 is utilized to modify the parameters of database 42 and perform other database utilities.

Report generator 60 generates reports utilizing information held in database 42. The reports can include such things as cash reconciliation, repair logs, or sales information. The reports can be generated manually by a user utilizing operator interface 56 or generated automatically as invoked by dispatching module 62.

Dispatching module 62 operates automatically to generate dispatch orders for repair and restocking of dispensing unit 10. Dispatching module 62 can cross-reference orders with closely located dispensing units 10 and with polling groups of dispensing units 10. Dispatching module 62 requests polling of dispensing units 10 depending upon the age of the available information in database 42. Polling comprises sending a status request message to the appropriate dispensing unit 10. Dispatching module 62 generates final stocking orders based upon stock log 50 and adjusts the orders for expected consumption prior to the time that dispensing unit 10 will be restocked. Dispatching module 62 generates final repair orders based upon repair log 48.

The database files in database 42 maintain all information necessary for operation of dispensing unit controller system 14. Communication log 44 stores incoming and outgoing messages. Master file 46 contains a master list of parameters for the entire system 8 of FIG. 1 including all dispensing units 10. Repair log 48 includes information as to present repair status of each dispensing unit 10, and stock log 50 includes information as to the present stock of each dispensing unit 10. History file 52 maintains reporting information for sales and repair history.

Processing of Messages.

Dispensing unit controller system 14 allows management of multiple dispensing units 10 by utilizing the event-driven status messages sent by dispensing units 10. Dispensing unit controller system 14 provides a number of features including: (i) on-line communications with all dispensing units 10 in system 8 through communications network 12, (ii) on-line query of any dispensing unit status, (iii) on-line dispatching of repair vehicles and collection of repair history, (iv) collection, generation and rooting of dispensing unit restocking orders, (v) collection of dispensing unit sales history, (vi) file maintenance of database master files, (vii) reporting and analysis utilities and (viii) interface to external information management systems.

A technical advantage of the present invention is that it provides real-time information about dispensing units 10 and vending operations to a user of dispensing unit controller system 14. Dispensing unit controller system 14 processes incoming information from dispensing units 10 in a real-time mode.

According to one embodiment of the present invention, dispensing unit controller system 14 processes information in a real-time mode by utilizing several independent processes operating contemporaneously in a computer environment. Communication interface 40, message processor 54, external interface 55, operator interface 56, file maintenance module 58, report generator 60 and dispatching module 62 are independent processes. These processes interface with database 42 to access shared information.

Database 42 is essential to the multiple independent processes in that database 42 includes information shared by all the processes. All communication with dispensing units 10 is accomplished through database 42 using communication log 44 as a buffer area. An entry is made in communication log 44 for every message transmitted through communications network 12. Message processor 54 processes the messages in communications log 44. Communications log 44 also serves as a short term communications history for use in trouble shooting and tuning system 8 of FIG. 1. Communications log 44 is automatically purged by message processor 54 after a user defined number of days.

Messages include three priorities: a high priority, a normal priority and a delay priority. Message processor 54 processes high priority messages immediately. Normal priority messages are processed when no more high priority messages are in communications log 44. Finally, communications interface 40 waits until a specified time to send out delayed messages, a priority only applicable to outgoing messages. Delay priority can be used to preschedule status request messages to be transmitted prior to order generation to make orders as accurate as possible. The delay priority can also be utilized to transmit status request messages during off hours to take advantage of reduced cost of communications network 12.

Message processor 54 performs all automatic processing of messages not requiring user intervention. Message processor 54 processes incoming messages retrieved from communications log 44. Message processor 54 then makes entries in stock log 50 and repair log 48, and updates dispensing unit message history and sales history in history file 52. Message processor 54 generates restocking orders and generates automatic polling messages. Message processor 54 periodically purges communication log 44, repair log 48, stock log 50 and history file 52. Message processor 54 updates such information as dispensing unit version number, the communication network type and the modem identification code in master file 46 whenever a message received from a dispensing unit 10 contains different values from those in master file 46. Message processor 54 also prepares system and bin initialization messages for transmission to dispensing units 10 in response to a cold-start message, or when corresponding parameters in the master file 46 change. Further, message processor 54 makes entries in repair log 48 in response to dispensing unit initialization failure and system failure messages, incoming messages from unknown dispensing units and dispensing units not responding to status request messages.

Operator Interface

Operator interface 56 of dispensing unit control system 14 provides general user access. Multiple users may access dispensing unit controller system 14 independent of the ongoing activity of the other processes. A user is allowed to interface with dispensing unit controller system 14 to perform a number of functions.

A user may perform an on-line request for the status of any dispensing unit 10 in system 8 of FIG. 1. After dispensing unit 10 responds, dispensing unit controller system 14 displays information from the response on operator interface 56. The user is allowed to transmit a status request message to any number of specific dispensing units 10.

A user also can perform repair dispatching. Operator interface 56 allows a user to schedule repairs to dispensing units 10, track the repair process and record the results for future reference. When a dispensing unit 10 transmits a message to dispensing unit controller system 14 indicating a problem, message processor 54 makes an entry in repair log 48. An entry is also made in repair log 48 if a dispensing unit does not respond to a status request message from dispensing unit controller system 14. When a user utilizes operator interface 56 to invoke dispatching module 62, dispatching module 62 looks for undispatched entries in repair log 48. In one embodiment of the present invention, these entries are displayed in a pop-up window in operator interface 56 in the order in which they were received. The user can select an entry for dispatching, and the repair is automatically entered in repair log 48 as being dispatched. The user can then contact a dispatcher and report the problem so that a repair driver and truck can be dispatched. When a message from a dispensing unit 10 indicates that a problem has been corrected, the repair entry in repair log 48 is closed by message processor 54.

A user also is able to prepare dispensing unit restocking orders. The generation of restocking orders is independent from the repair dispatching function. Message processor 54 processes current dispensing unit status information, generates a restocking order and places the order in stock log 50. A user can access stock log 50 to schedule delivery trucks for service to dispensing units 10 based on stock log 50. A route driver services dispensing units 10 by restocking them, collecting the contents of the coin box, performing minor repairs and adjustments, and generally cleaning the dispensing units 10. An on-demand method of dispensing unit restocking is utilized. In this on-demand restocking environment, each dispensing unit 10 provides dispensing unit controller system 14 with messages indicating that service is needed. A dispensing unit 10 is not serviced until it has at least one bin that is low in inventory. This provides the least number of service calls per dispensing unit 10 keeping service costs down. However, if a location has several dispensing units 10 in the same vicinity or is located at a remote site requiring a long drive, it may be desirable to service several dispensing units 10 at the same time even though some do not require service.

A dispensing unit polling group can be defined to group dispensing units 10 that should be serviced together. Dispensing unit controller system 14 automatically requests the status of all dispensing units 10 in a polling group and generates stocking orders for each of these dispensing units 10 after any dispensing unit 10 in the polling group has reached a low stock point in one bin or otherwise requires service.

A dispensing unit inventory group can be defined to combine multiple dispensing units 10 together to form a virtual dispensing unit preventing a restocking order from being generated as long as a reported low stock product is available from another dispensing unit 10 in the inventory group.

When restocking orders are printed for delivery, dispensing units 10 are automatically polled and the order is updated to make deliveries as accurate as possible. Dispensing unit controller system 14 then verifies that the reported low stock product is not available in another dispensing unit belonging to a common polling group or inventory group. If the product is available, no further action is taken. If the product is not available, a stocking order is generated.

When a stocking order is created, an adjustment is then made for the expected sales between the time the order is created and the time when dispensing unit 10 is expected to be serviced. The current sales quantity for each bin 20 in dispensing unit 10 is calculated by subtracting the current inventory as reported in the last status message from the bin capacity as stored in master file 46. The dispensing unit restocking schedule and the dispensing unit daily sales history are then examined to total the daily sales quantities for the next scheduled delivery day and any days preceding it. The total is added to the current sales quantity resulting in the actual order quantity for that bin. After order quantities are calculated for bins 20 in dispensing unit 10, the orders are stored in stock log 50 for later dispatching. Stock log 50 is searched for orders that are older than a user defined period of time. The dispensing units having old orders are polled and the updated information is used to recalculate the order as prescribed above. Once the order is accurate, dispensing unit polling groups are used to determine if any other dispensing units are to be serviced during the same delivery. If other dispensing units are to be serviced, history file 52 is scanned for inventory information. If current inventory status is not available, the dispensing unit is polled to obtain that information and an order is created as before. Once all the orders are generated, the orders are assigned to different delivery trucks and route drivers.

A user is further enabled to use operator interface 56 to perform dispensing unit cash reconciliation. This allows a user to reconcile the amount of money collected from a dispensing unit 10, the amount of money turned in by a route driver, the amount of money left as change in a dispensing unit 10 and other factors. Dispensing unit 10 counts the number of sales per bin and automatically transmits this information to dispensing unit controller system 14. For dumb coin mechanisms, a standard amount of change per dispensing unit is defined. The route driver refills dispensing unit 10 to this defined level at each servicing and fills out a money disbursement form for any money not accounted for. A cashier can enter the amount of money in the coin bag returned by the route driver. The reconciliation report then utilizes the following equation to perform reconciliation: total money due per the dispersing unit minus money in coin bag minus other disbursements recorded on the disbursement form equals zero (if in balance). This can be a zero balance system requiring the route driver to sign a disbursement form for missing money. An out of change report can be generated periodically to help identify those dispensing units 10 that have excessive out of change conditions so that the situation can be investigated.

A user can perform a number of additional functions. A user can collect dispensing unit sales history information by controlling the collection of history information by dispensing unit and by time period. Various reports and analyses can be generated from this history information held by history file 52 in database 42. A number of reports, including current status, daily, weekly, and monthly reports are available to the user through operator interface 56. Such reports further include a change in sales volume report, a multiple out of stock report and a cash receipts report. Utilities for doing such things a purging data from the database, checking database integrity and reinitializing any file in the database are also available through user interface 56. The operator interface 56 further allows interface to external computer systems to allow dispensing unit controller system 14 to interact with the external computer systems. These external systems include Depot Manager, ADA, and Truck Stops. The external interface allows an import and export of information to and from these external computer systems.

Controller System Database

Database 42 of dispensing unit controller system 14 includes a number of database files as described above. Some of these database files are described here in more detail with respect to one embodiment of the present invention. Database 42 includes master file 46 that contains system control information. This control information includes parameters for dispensing units 10 and includes database file maintenance information such as the number of days to retain information in communication log 44, to retain repair entries in repair log 48, and to retain restocking orders in stock log 50. Master file 46 also includes the number of days to keep message history headers and to keep dispensing unit sales history in history file 52, and the number of days to keep information for calculating average sales by day. Additional information held by master file 46 includes an acceptable restocking order age, a communications retry count, and an auto machine initialization control.

Master file 46 in database 42 further includes a record for each owner of dispensing units 10 in system 8. This record includes owner number, owner name, owner address, owner phone number, a contact, emergency phone number and emergency contact. Master file 42 includes a master record for each product in dispensing units 10 in system 8 is containing a product number, a product description, units per case count and safe carry over percentage.

A master record for each dispensing unit 10 in system 8 is also held in master file 46. This master record includes a dispensing unit serial number, a dispensing unit controller identification code, software version and application version, a dispensing unit control table number, a communications network type, a communications modem identification number if appropriate, an owner number if appropriate, a dispensing unit type, a dispensing unit inventory group code, a dispensing unit polling group code, a dispensing unit repair group code, a dispensing unit stocking group code and a record changed flag.

Master file 46 further includes a dispensing unit control table file with fields that contain values common to a large group of dispensing units. The dispensing unit control table file includes a dispensing unit control table number, a coin mechanism type, the number of bins, a monitor temperature flag, a maximum acceptable temperature, a minimum acceptable temperature, a temperature recheck interval, a no activity time out period, a door open time out period, an initial inventory message control, a multiple inventory message control, a collect sales history flag, a change bank size and a record changed flag. The multiple inventory message control field includes five states which are: (1) no additional messages, (2) send additional messages when bins are out of stock, (3) send additional messages when bins are at the minimum reorder point or below, (4) send additional messages when bins are at the maximum reorder point or below, and (5) send additional messages as any new reference point is reached.

Master file 46 further includes a bin master file to identify each bin in each dispensing unit 10 in system 8. The bin master file includes: a dispensing unit serial number, a bin number, a bin control table number, a product number of the product currently in the bin, a current bin price and a record changed flag. Master file 46 also includes a bin control table file with fields that contain values common to a large group of dispensing unit bins. This bin control table file includes a bin control table number, a bin capacity, a bin reference level, a maximum reorder level, a minimum reorder level and a record changed flag.

Master file 46 includes a dispensing unit inventory group master file to allow grouping of individual dispensing units 10 for low stock evaluations. This inventory group master file contains an inventory group number and an inventory group name and description. There is also a dispensing unit polling group master file to allow grouping of individual dispensing units for polling with status request messages. This file includes a polling group number and a polling group name description.

A dispensing unit restocking group master file is also held by master file 46. This restocking group master file has a record for each dispensing unit restocking group. Dispensing unit restocking groups link groups of delivery trucks to the dispensing units they service. This file is used for scheduling of vehicles to deliver restocking orders to dispensing units. This file includes a restocking group number and a group name description.

A delivery truck master file is included in master file 46. This file has a record for each dispensing unit restocking vehicle in the system and contains: a vehicle identification number, a restocking group number and a current route driver number. Master file 46 also includes a dispensing unit repair group master file. This file has a record for each dispensing unit repair group. Dispensing unit repair groups link groups of repair trucks to the dispensing units they service. This file is used for repair dispatching and contains a repair group number and a group name description. There is further a repair truck master file. This file has a record for each dispensing unit repair vehicle in the system and contains a vehicle identification, a repair group number, and a current route driver number.

Master file 46 also includes a dispensing unit restocking order header file. This file identifies a restocking order for the next servicing of each dispensing unit 10. The restocking order is generated automatically when a dispensing unit 10 sends a low stock message or when a dispensing unit is polled for restocking purposes by dispensing unit controller system 14. A restocking order is retained for a user controlled period of time and includes: a dispensing unit number, a delivery date, a delivery route number, a delivery sequence and a total quantity in order.

Master file 46 further includes a dispensing unit restocking order detail file. This file contains the product inventory restocking detail by bin. The current bin inventory is subtracted from the bin capacity to determine the order quantity. This file includes a dispensing unit number, a delivery date, a bin number, a product number and an order quantity.

History file 52 includes combined dispensing unit message and restocking history retained for a user controlled period of time. A restocking record is created in history file 52 by message processor 54 every time a dispensing unit 10 sends a message to dispensing unit controller system 14. History file 52 includes records having a dispensing unit serial number, a date and time of a message, a current network identification code, a current dispensing unit identification code on the network, a current dispensing unit controller identification code, a dispensing unit software version and application version, an amount of money in the cash box, a route number and a driver number of the service and route. History file 52 further includes the dispensing status at the time of servicing. This status includes a message reason code, a communications retry count, a dispensing unit status code, a temperature and a number of bins.

History file 52 further includes a combined dispensing unit message and bin history file. A bin record is created in history file 52 by message processor 54 every time a dispensing unit sends a message to dispensing unit controller system 14 regarding product inventory. The data in these records includes: a dispensing unit serial number, a date and time of servicing, a bin number, a bin status code, how many vends occurred between the time the bin was refilled last and when the reference level was passed on the way down, a bin inventory, a current capacity, a current bin reference level, a current maximum reorder level, a current minimum reorder level, a quantity of product currently in the bin and a current product price.

History file 52 further includes a dispensing unit sales history file that holds sales per bin per unit of time. The data is retained for a user controlled period of time. The file contains: a dispensing unit serial number, a bin number, a date, a collection period and a number of vends during this period.

Communication log 44 in database 42 contains all incoming and outgoing messages between dispensing unit controller system 14 and dispensing units 10. The data in communication log 44 is retained for a user defined period of time. Message processor 54 processes the incoming messages and generates outgoing messages. Communication log 44 contains stored messages that include certain information such as: date and time, message type flag, message status flag, message priority, message transmission date and time, network identification code, dispensing unit identification code and message text. The message priority in one embodiment of the present invention includes a high priority, a normal priority and a delayed priority.

Database 42 also includes a repair log 48. A record is created in repair log 48 each time a dispensing unit sends a repair request message. These records track the servicing of repair requests. The data in this file is retained for a user controlled period of time. The file contains a dispensing unit number, a date and time of request, a message status, a date and time of repair trunk dispatching, a repair vehicle number, a repair persons' identification code, a latest estimate of response date and time from repair person, a number of redispatching for this repair, a date and time of the problem and the correction, a repair code and a text of comments from the repair report.

Dispensing Unit Bin

Figure 4:
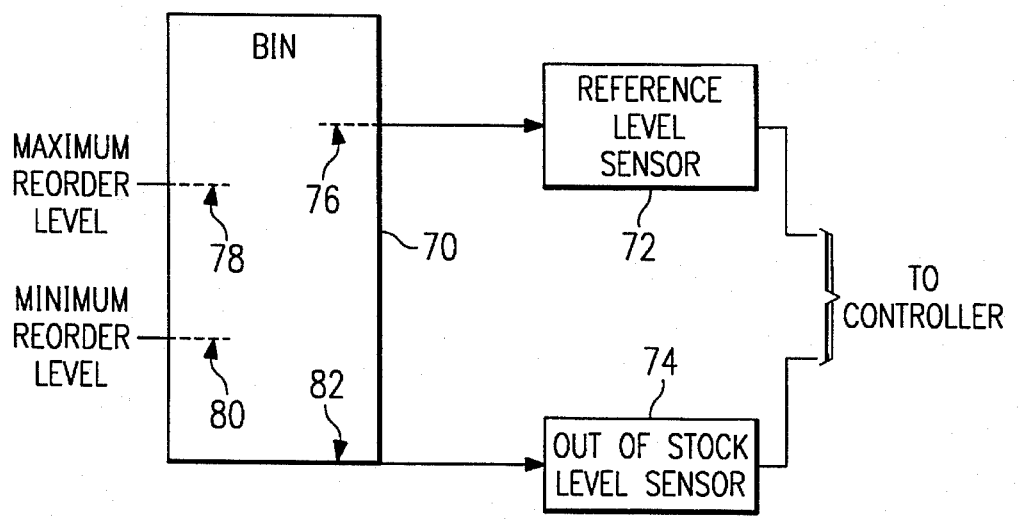
FIG. 4 is a block diagram of a bin in a dispensing unit constructed according to the teachings of the present invention.

FIG. 4 illustrates a block diagram of a bin 70 constructed according to the teachings of the present invention. Bin 70 may comprise one of the bins 20 discussed previously. With respect to soft drink vending machines, bin 70 may comprise a vertical stack bin or a serpentine bin. Bin 70 is coupled to a reference level sensor 72 and to an out-of-stock level sensor 74. Reference level sensor 72 and out-of-stock level sensor 74 are coupled to controller 26 of associated dispensing unit 10.

In operation, reference level sensor 72 and out-of-stock level sensor 74 monitor the quantity of product in bin 70 with respect to defined reference points. Reference level sensor 72 operates to sense when the quantity of product in bin 70 passes reference level 76. Maximum reorder level 78 and minimum reorder level 80 are identified with respect to reference level 76. Dispensing unit 10 maintains a count of the number of vends from bin 70 and determines when the quantity of product has moved from reference level 76 to maximum reorder level 78 and to minimum reorder level 80. Reference point 82 is sensed by out of stock level sensor 74 and indicates bin 70 is completely out of product.

Bin 70 is monitored so that dispensing unit 10 can transmit messages to dispensing unit controller system 14 when the quantity of product in bin 70 passes any of the four reference points. Reference level 76 is the highest quantity of product in bin 70 that is monitored. Reference level sensor 72 is a physical sensor installed in dispensing unit 10 to monitor bin 70. The quantity of product required to trip reference level sensor 72 is a parameter loaded into dispensing unit 10 by dispensing unit controller system 14. When the quantity of product in bin 70 is above reference level 76, bin 70 is considered to be full. At this stage, a vend counter in dispensing unit 10 is set to zero, and the bin inventory is set to equal the quantity of product that trips reference level sensor 72. For each sale, the vend counter is incremented as long as the bin inventory of bin 70 remains above reference level 76. When the quantity of product crosses reference level 76, controller 26 in dispensing unit 10 stops incrementing the vend counter. Controller 26 then decrements an inventory counter starting from a quantity equal to reference level 76 for each vend until bin 70 is either empty or again refilled above reference level 76.

Maximum reorder level 78 is the next reference point down from reference level 76. This reference point is not sensed physically, but is determined with respect to reference level 76 and the number of vends. Maximum reorder level 78 is the point at which it is sensible to consider restocking bin 70 if dispensing unit 10 or other dispensing units nearby are being serviced. Maximum reorder level 78 is set by dispensing unit controller system 14. Dispensing unit 10 checks the bin inventory count after each vend to determine whether maximum reorder level 78 has been reached.

Minimum reorder level 80 is the next reference point down from maximum reorder level 78. Minimum reorder level 80 is the point at which it is time to schedule this dispensing unit 10 for restocking because bin 70 will be approximately empty when dispensing unit 10 is restocked due to continued sales. Minimum reorder level 80 is set by dispensing unit controller system 14. Dispensing unit 10 checks the bin inventory count after each vend to determine whether minimum reorder level 80 has been reached.

Out-of-stock level 82 is sensed by out-of-stock level sensor 74 and indicates when bin 70 is empty. Out-of-stock level 82 is a physical reference point that is sensed by out-of-stock level sensor 74 in most conventional dispensing units.

Reference Level Sensor

Figure 5A:
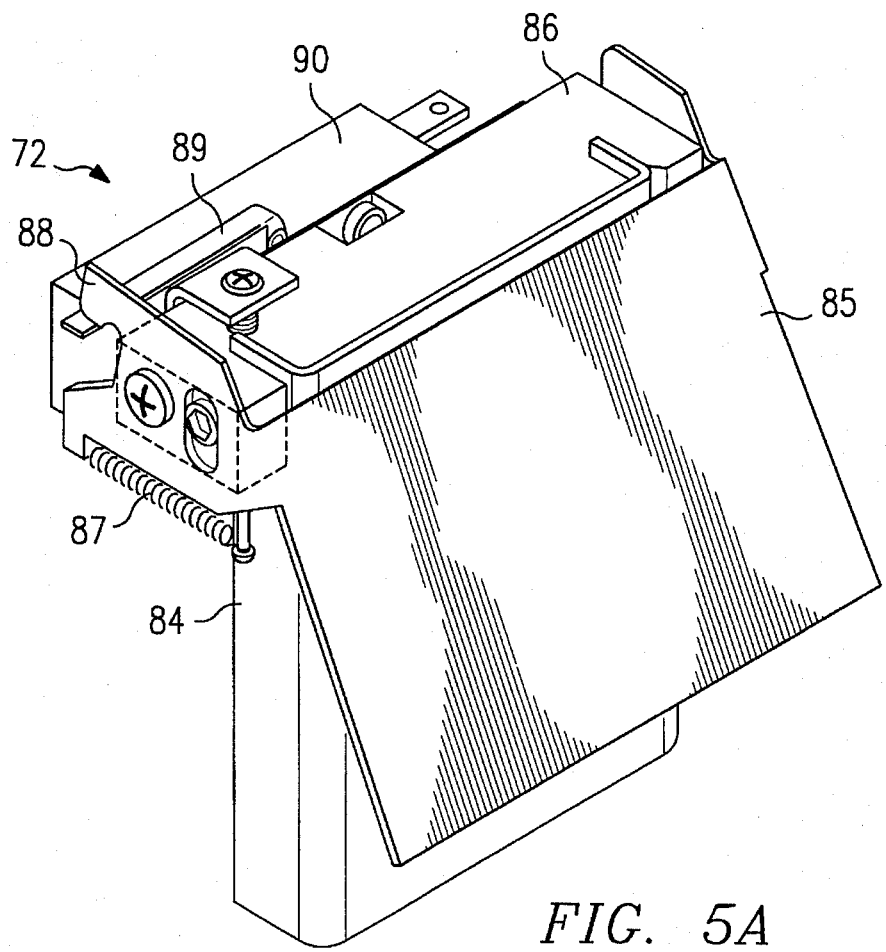
FIGS. 5A, 5B, 5C and 5D illustrate embodiments of reference level sensors for a vertical stack bin and serpentine bins constructed according to the teachings of the present invention.

FIG. 5A illustrates one embodiment of reference level sensor 72 for a vertical stack bin constructed according to the teachings of the present invention. This implementation is used for vertical stack dispensing units including, but not limited to: DIXIE NARCO types 240, 368, 440, 522 and VENDO types V280, V392 and V470. Reference level sensor 72 includes a body 84. A flipper 85 is movably coupled to a mounting portion 86 of body 84. Body 84 is an integral part of conventional vertical stack dispensing units and is referred to in the industry as a "backspacer." A spring 87 is coupled to mounting portion 86 and flipper 85 to hold flipper 85 in an extended state. An extension 88 of flipper 85 contacts a trigger 89 of a mechanical actuator 90.

In operation, reference level sensor 72 allows product in the vertical stack bin to release flipper 85, which depresses trigger 89 and causes mechanical actuator 90 to generate a signal. Reference level sensor 72 is operable to attach to a back surface of a vertical stack bin in a soft drink dispensing unit such that flipper 85 is depressed upon stocking of cans past the point where reference level sensor 72 is installed. When flipper 85 is depressed, trigger 89 is not depressed. When the quantity of soft drinks in the bin drops below the bottom lip of flipper 85, spring 87 causes extension 88 to depress trigger 89. When trigger 89 is depressed, mechanical actuator 90 generates a signal that is then transmitted to indicate a sensing of product passing below the reference level.

Figure 5B:
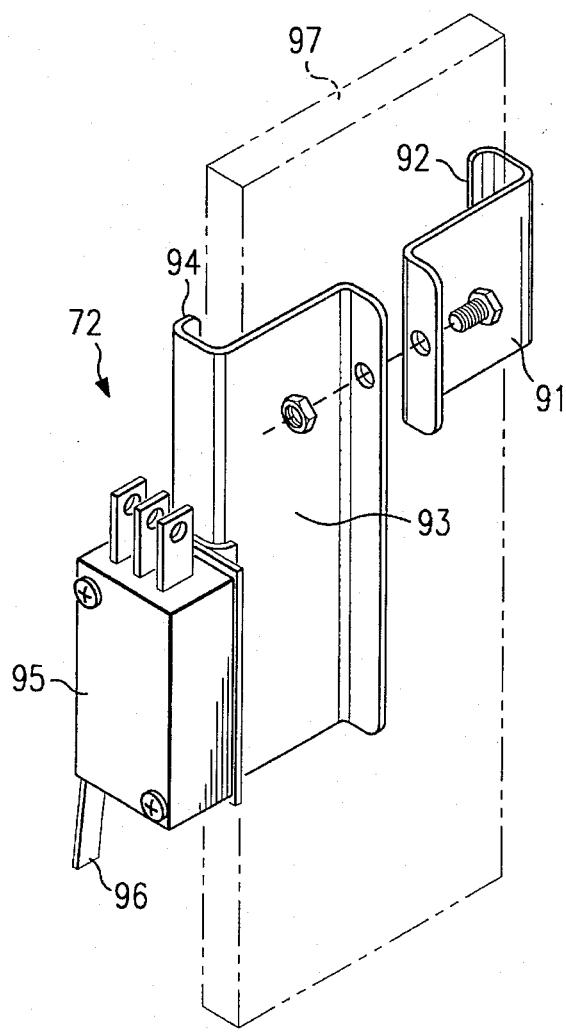

FIG. 5B illustrates another embodiment of reference level sensor 72 for a serpentine bin constructed according to the teachings of the present invention. This implementation is used for the front serpentine bins and the first and second rear bins of conventional serpentine dispensing units including, but not limited to, VENDO types V382 and V444. Reference level sensor 72 comprises a clamp bracket 91 having a mounting surface 92. A main bracket 93 has a mounting surface 94. A mechanical actuator 95 is coupled to main bracket 93 and has a trigger 96.

In operation, reference level sensor 72 allows product to release trigger 96, causing mechanical actuator 95 to generate a signal. Reference level sensor 72 is operable to attach to a support 97 proximate a serpentine bin in a soft drink vending machine such that trigger 96 is depressed upon stocking of cans past the point where reference level sensor 72 is installed. Reference level sensor 72 is coupled to support 97 by coupling clamp bracket 91 to main bracket 93, as shown. When the quantity of soft drinks in the serpentine bin drops below trigger 96, trigger 96 releases. When trigger 96 releases, mechanical actuator 95 generates a signal that is then transmitted to indicate a sensing of product passing below the reference level.

Figure 5C:
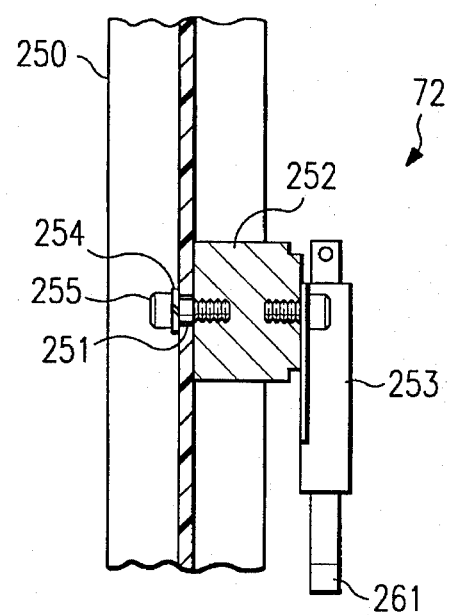

FIG. 5C illustrates another embodiment of reference level sensor 72 for a serpentine bin constructed according to the teachings of the present invention. This implementation is used for the first and second center bins of conventional serpentine dispensing units including, but not limited to, VENDO types V382 and V444. Reference level sensor 72 is coupled to plastic flange 250 having a drilled hole 251. Reference level sensor 72 comprises a spacer 252 and a mechanical actuator 253 coupled to spacer 252. Spacer 252 is coupled to plastic flange 250 by a lock washer 254 and a screw 255.

In operation, reference level sensor 72 allows product to release a trigger 261 of mechanical actuator 253. This causes mechanical actuator 253 to generate a signal. Reference level sensor 72 is operable to attach to plastic flange 250 proximate a serpentine bin in a soft drink vending machine such that trigger 261 is depressed upon stocking of cans past the point where reference level sensor 72 is installed. Reference level sensor 72 is coupled to plastic flange 250 by coupling spacer 252 to plastic flange 250, as shown. When the quantity of soft drinks in the serpentine bin drops below trigger 261, trigger 261 releases. When trigger 261 releases, mechanical actuator 253 generates a signal that is then transmitted to indicate a sensing of product passing below the reference level.

Figure 5D:
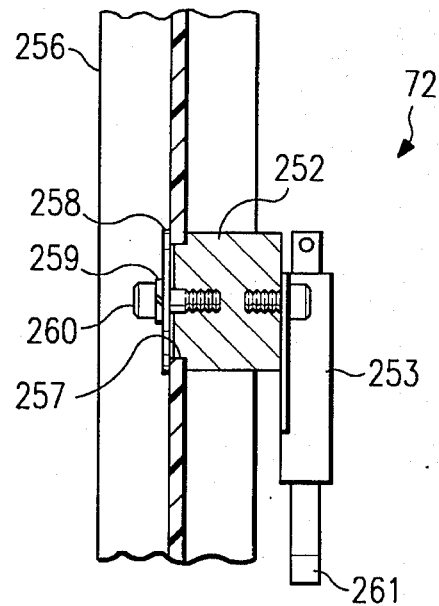

FIG. 5D illustrates a third embodiment of reference level sensor 72 for a serpentine bin constructed according to the teachings of the present invention. This implementation is used for the third through sixth rear serpentine bins of conventional serpentine dispensing units including, but not limited to, VENDO types V382 and V444. Reference level sensor 72 comprises spacer 252 and mechanical actuator 253, as described with respect to FIG. 5C. Plastic flange 256 has an existing hole 257. Spacer 252 is coupled to plastic flange 256 by washer 258, lock washer 259 and screw 260, as shown.

In operation, reference level sensor 72 allows product to release trigger 261 of mechanical actuator 253, causing mechanical actuator 253 to generate a signal. Reference level sensor 72 is operable to attach to plastic flange 256 proximate a serpentine bin in a soft drink vending machine such that trigger 261 is depressed upon stocking of cans past the point where reference level sensor 72 is installed. Reference level sensor 72 is coupled to plastic flange 256 by coupling spacer 252 to plastic flange 256, as shown. When the quantity of soft drinks drops below trigger 261, trigger 261 releases. When trigger 261 releases, mechanical actuator 253 generates a signal that is then transmitted to indicate a sensing of product passing below the reference level.

Block Diagrams of Controller Subsystem

Figure 6:
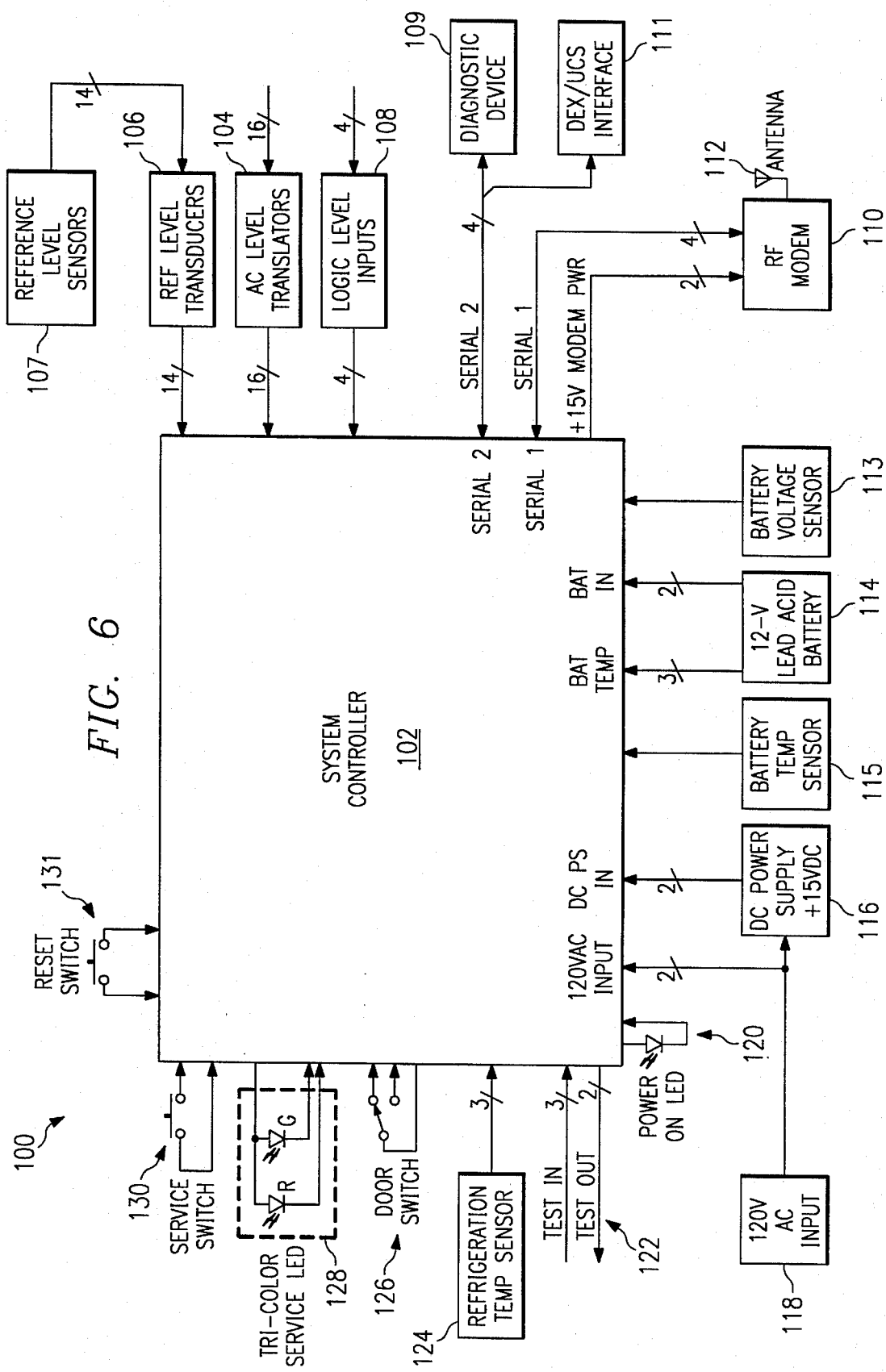
FIG. 6 is a block diagram of one embodiment of a controller subsystem for a dispensing unit constructed according to the teachings of the present invention.

FIG. 6 illustrates a block diagram of one embodiment of a dispensing unit controller subsystem indicated generally at 100. Controller subsystem 100 includes a system controller 102. A plurality of AC level translators 104 are coupled to system controller 102 as shown. AC level translators 104 receive signals from AC status sensors monitoring conditions of the dispensing unit. A plurality of reference level transducers 106 are coupled to system controller 102 and receive signals from a plurality of reference level sensors 107. Reference level sensors 107 are connected to the bins in the dispensing unit. A plurality of logical inputs 108 are connected to system controller 102 and receive logic level input signals.

A diagnostic device 109 and a DEX/UCS interface can be connected to a second serial port SERIAL 2 of system controller 102. A radio frequency modem 110 is coupled to system controller 102. Modem 110 receives a fifteen volt DC MODEM PWR and is connected to a first serial port SERIAL 1. Modem 110 is coupled an antenna 112.

A battery voltage sensor 113 is coupled to system controller 102. A 12 volt lead acid battery 114 is coupled to the BAT TEMP input and BAT IN input of system controller 102, as shown. Battery voltage sensor 113 monitors the voltage of battery 114. A battery temperature sensor 115 is also coupled to system controller 102 and monitors the temperature of battery 114. A DC power supply 116 is coupled to the DC PS IN input of system controller 102. A 120 volt AC input power source 118, derived from the dispensing unit, is coupled to a 120 VAC input of system controller 102. A power-on LED 120 is also coupled to system controller 102.

System controller 102 includes TEST IN lines and TEST OUT lines indicated generally at 122, as shown. A refrigeration temperature sensor 124 is coupled to system controller 102. A door switch 126 provides a signal to system controller 102, and a tri-colored service LED 128 also provides a signal to controller 102. System controller 102 receives a signal from service switch 130 and from reset switch 131.

In operation, controller subsystem 100 operates to control and monitor a dispensing unit. Controller subsystem 100 connects the dispensing unit with a dispensing unit controller system in a system for managing multiple dispensing units according to the teachings of the present invention. System controller 102 receives input signals that reflect the monitored conditions of the dispensing unit. System controller 102 processes the input signals utilizing software operating within system controller 102.

System Controller

Figure 7:
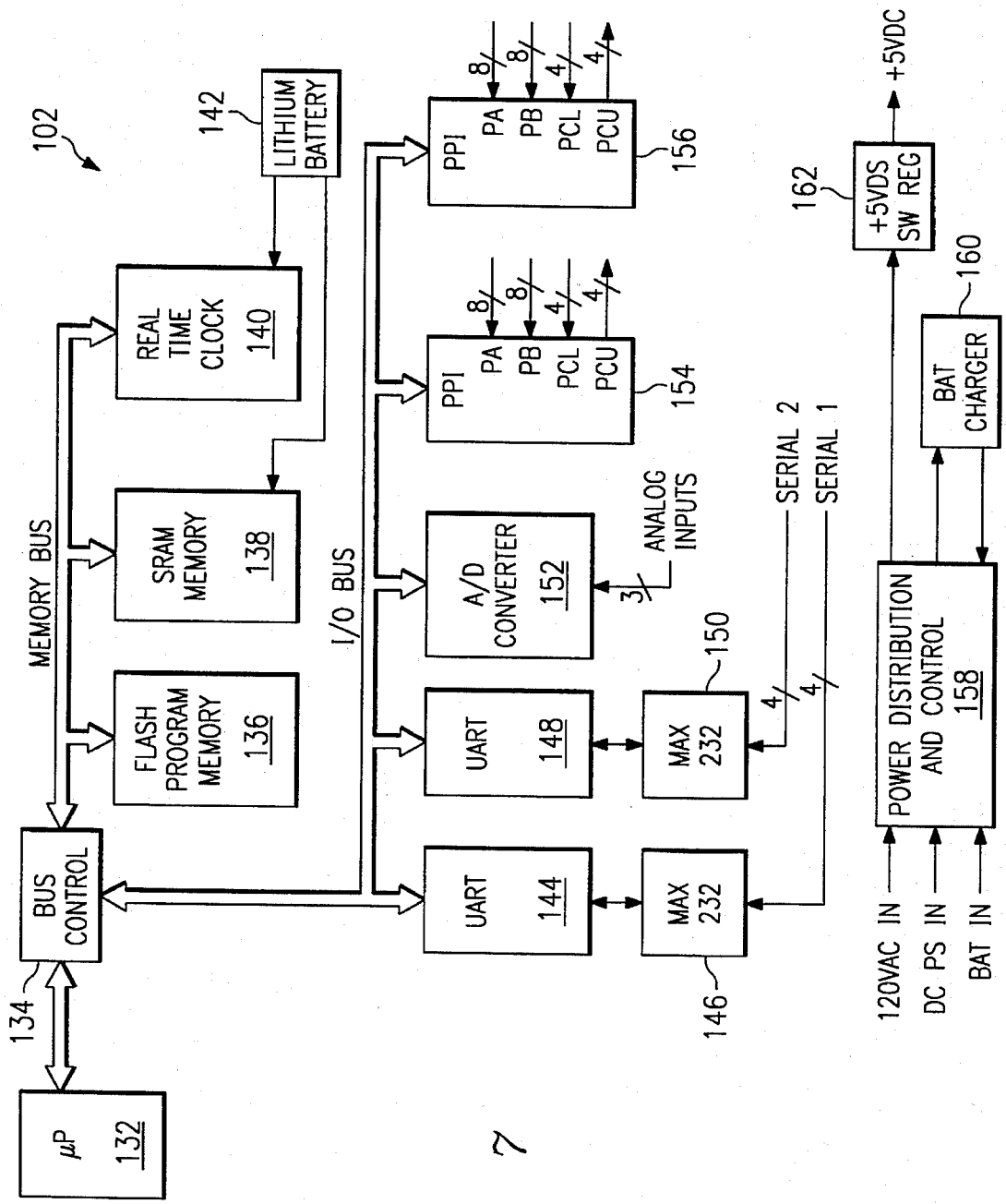
FIG. 7 is a block diagram of one embodiment of the controller functions and bus orientation of the system controller of FIG. 6.

FIG. 7 illustrates a block diagram of system controller 102 of FIG. 6. System controller 102 includes a microprocessor 132. Microprocessor 132 is coupled to a bus control 134. Bus control 134 controls a memory bus and an input/output (I/O) bus, as shown. A flash program memory 136, an SRAM memory 138 and a real time clock 140 are coupled to the memory bus. A lithium battery 142 is coupled to real time clock 140 and to SRAM memory 138. A UART 144 and a UART 148 are coupled to the I/O bus. An A/D converter 152, a PPI 154 and a PPI 156 also are coupled to the I/O bus. A/D converter 152 receives analog input signals, and PPI 154 and PPI 156 receive inputs and provide outputs as shown. An interface 146 and an interface 150 are coupled to UART 144 and UART 148. Interface 146 is coupled to the first serial port SERIAL 1, and interface 150 is coupled to the second serial port SERIAL 2. A power distribution and control block 158 receives input signals as shown. A battery charger 160 is coupled to power distribution and control 158 and a DC regulator 162 is coupled to power distribution and control 158.

In operation, system controller 102 operates to control a dispensing unit. Microprocessor 132 executes a controller program held in flash program memory 136 and utilizes information in SRAM memory 138 to process information received from the I/O bus as to the status of the dispensing unit. In this manner, microprocessor 132 can control a dispensing unit to interface with a communications network and a dispensing unit controller system according to the teachings of the present invention.

Power Distribution and Control

Figure 8:
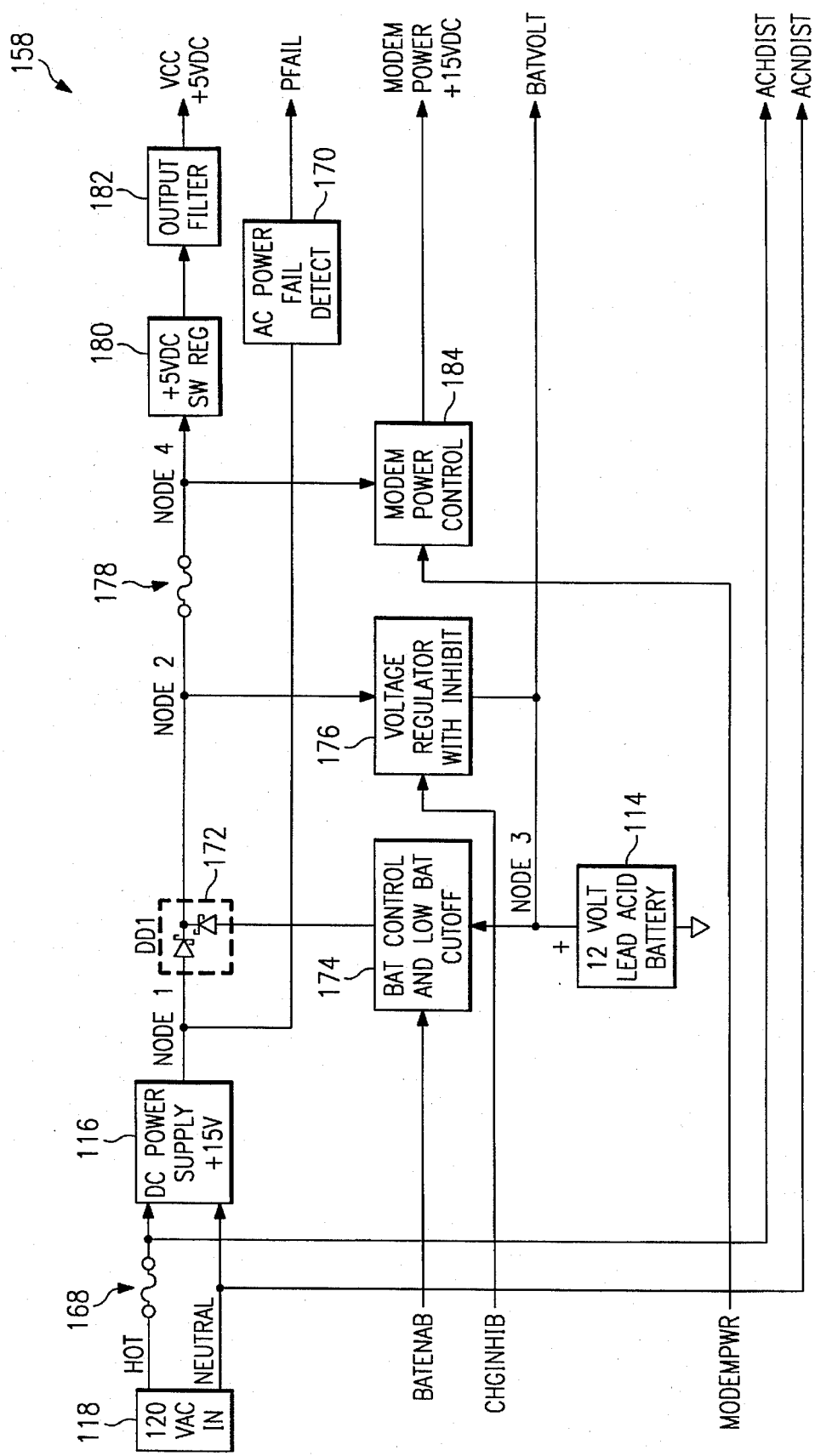
FIG. 8 is a block diagram of one embodiment of the power distribution and control of FIG. 7.

FIG. 8 illustrates a block diagram of power distribution and control 158 of FIG. 7. Power distribution and control 158 includes a 120 volt AC input source 118 coupled to a DC power supply 116, as shown. AC input 118 includes a hot line HOT and a neutral line NEUTRAL. A fuse 168 is coupled between AC input 118 and DC power supply 116. DC power supply 116 is coupled to NODE 1 as shown. An AC power fail detector 170 is coupled to NODE 1 and provides a power fail signal PFAIL. Diodes 172 are coupled to NODE 1 and to NODE 2, as shown. A battery control and cutoff 174 receives a battery enable signal BATENAB and is coupled to diodes 172. Lead acid battery 114 is coupled to NODE 3 and provides a signal to battery control and cutoff 174, as shown. NODE 3 provides a battery voltage signal BATVOLT. A precision voltage regulator with inhibit 176 receives a charge inhibit signal CHGINHIB and is coupled to NODE 2. When asserted, CHGINHIB prevents lead acid battery 114 from receiving charging current. This feature is useful when the AC input has failed and the system has been on battery power for an extended period of time. Upon re-application of AC input power, DC power supply 116 must be able to power the RF modem in initial transmit status.

A fuse 178 is coupled between NODE 2 and NODE 4 as shown. A five volt DC switching regulator 180 is coupled to NODE 4 and provides a signal to an output filter 182. Output filter 182 removes switching frequency transients from switching regulator 180 output and provides a five volt DC power line. A modem power control 184 is coupled to NODE 4 and receives a modem power signal MODEM PWR. Modem power control 184 then provides a modem power line. The HOT line and NEUTRAL line from AC input 118 comprise the AC hot distributed signal ACHDIST and the AC neutral distributed signal ACNDIST.

In operation, power distribution and control 158 provides power to system controller 102. Power distribution and control system 158 also operates to detect power failures and provide signals to system controller 102.

AC Level Translators

Figure 9A:
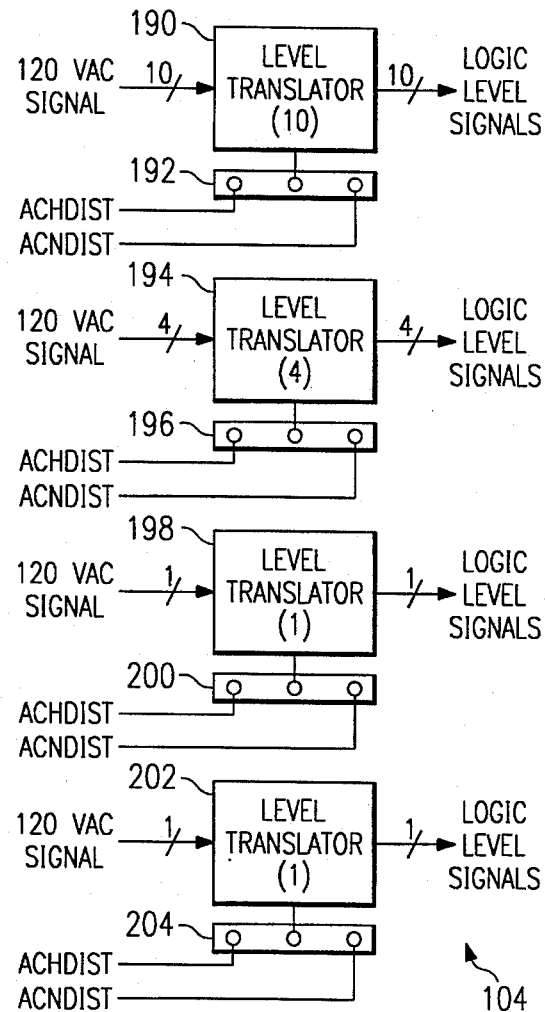
FIG. 9A is a block diagram of one embodiment of the AC level translators of FIG. 6.

FIG. 9A illustrates a block diagram of AC level translators 104 of FIG. 6. As shown, AC level translators 104 include a number of groups of AC level translators. Level translator 190 includes ten AC level translators. Level translator 190 receives ten 120 volt AC input signals and provides ten logic level output signals. A jumper 192 is coupled to level translator 190 and receives the ACHDIST signal and the ACNDIST signal. The center terminal of jumper 192 is coupled to the appropriate AC signal for sensing the AC input signals to level translator 190. Similarly, level translator 194 receives four AC input signals and provides four logic level output signals. Jumper 196 is coupled to level translator 194 and is configured with the center jumper coupled to ACHDIST or ACNDIST, as appropriate.

Level translator 198 includes one AC level translator. Level translator 198 receives one AC input signal and provides one logic level output signal. Jumper 200 is coupled to level translator 198 and receives the ACHDIST signal and the ACNDIST signal as above. The center jumper of jumper 200 is coupled to the appropriate signal for sensing the AC input signal to level translator 198. Level translator 202 also includes one AC level translator. Level translator 202 receives one AC input signal and provides one logical output signal. Jumper 204 is coupled to level translator 202 and receives the ACHDIST signal and the ACNDIST signal as shown. Jumper 204 is configured appropriately to sense the AC input signal to level translator 202.

Figure 9B:
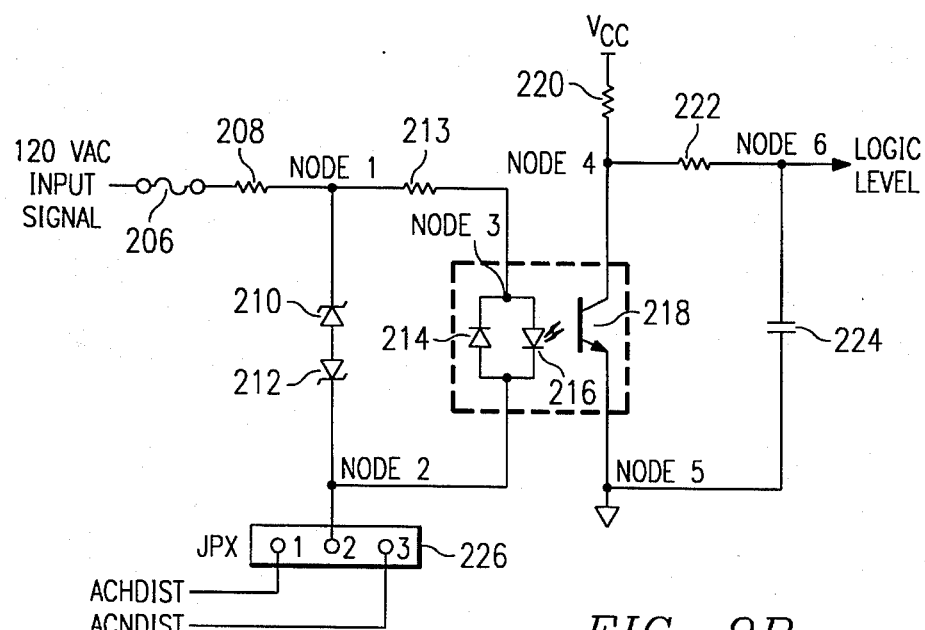
FIG. 9B is a circuit diagram of one embodiment of an AC level translator of FIG. 9A.

FIG. 9B illustrates a circuit diagram of one AC level translator of FIG. 9A. The 120 volt AC input signal is coupled to a fuse 206. Resistor 208 is coupled to NODE 1, as shown. A zener diode 210 and a zener diode 212 are coupled between NODE 1 and NODE 2. A resistor 213 is coupled between NODE 1 and NODE 3. LED diodes 214 and 216 are coupled to NODE 3 and to NODE 2, as shown. A photo transistor 218 is coupled to NODE 4 and to NODE 5. A resistor 220 is coupled between VCC power supply and NODE 4. A resistor 222 is coupled between NODE 4 and NODE 6, and a capacitor 224 is coupled between NODE 5 and NODE 6. NODE 6 provides a logic level output. A jumper 226 has three jumper terminals. The ACHDIST signal is coupled to the first jumper terminal, and the ACNDIST signal is coupled to the third jumper terminal. NODE 2 is coupled to the second jumper terminal. The second jumper terminal can be connected to either the first or third jumper terminal to provide NODE 2 with either the ACHDIST or the ACNDIST signal.

The AC level translator of FIG. 9B operates to compare the 120 volt AC input signal to the signal jumpered to NODE 2. The AC level translator then operates to sense a full 120 volt AC signal swing across the circuit. This configuration is necessary because the 120 VAC input signal received from particular dispensing unit functions can be either the hot or neutral side of the 120 VAC line. Therefore, the appropriate jumper is selected at factory test, depending on dispensing unit model. The AC level translator then provides a logic level output indicating that the full signal has been sensed.

Input/Output Bus

Figure 10:
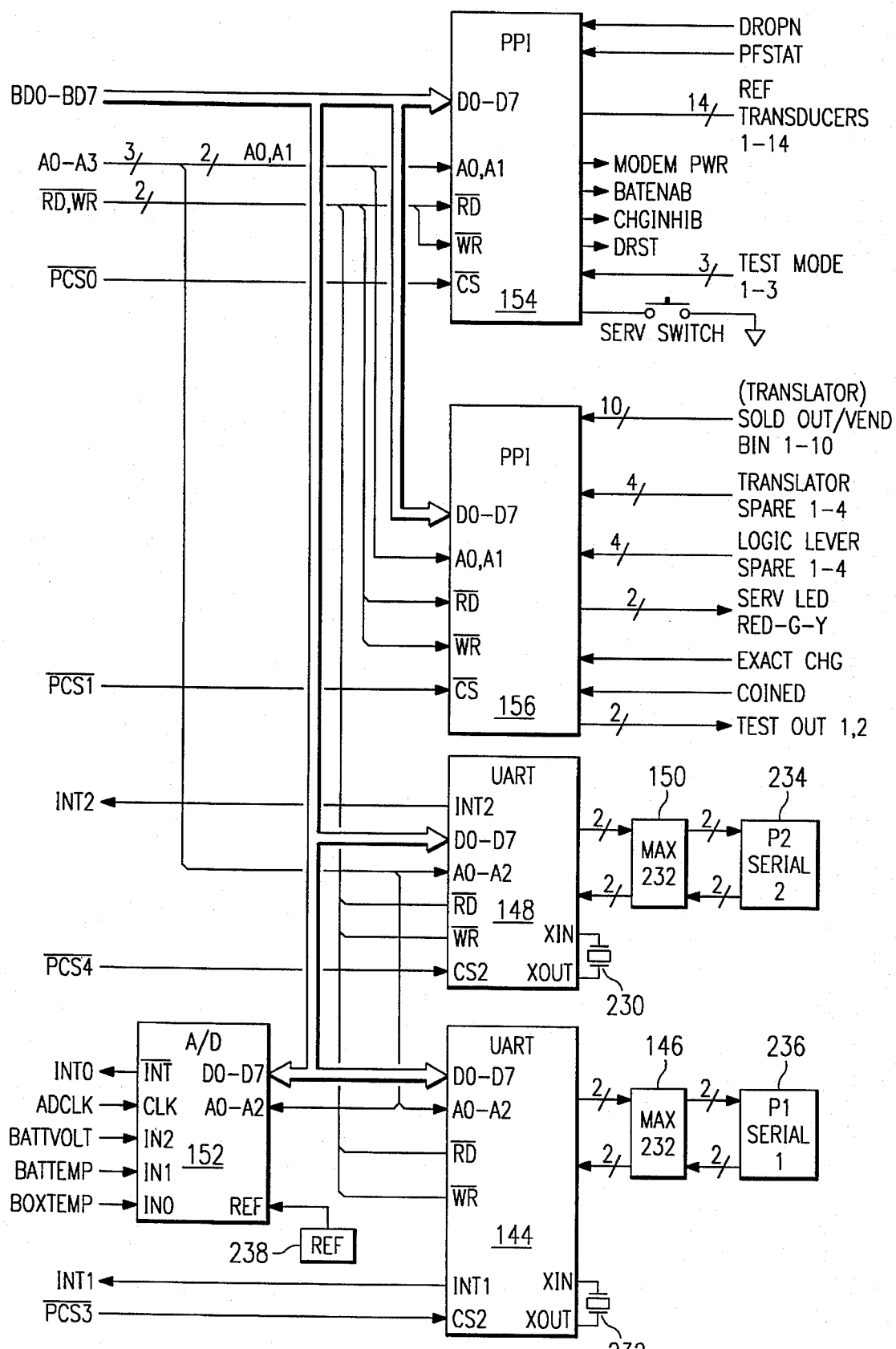
FIG. 10 is a block diagram of one embodiment of the input/output (I/O) signals of the system control I/O bus of FIG. 7.

FIG. 10 illustrates in more detail the I/O bus of controller system 102 of FIG. 7. PPI 154 receives data on inputs D0 through D7. PPI 154 also receives the signals AO0, AO1, $\overline{RD}$, $\overline{WR}$ and $\overline{CS}$, as shown. PPI 154 also receives the following additional signals: DROPN, PFSTAT, fourteen reference transducers signals, and three test mode signals. PPI 154 provides the following signals: MODEM PWR, BATENAB, CHGINHIB, and DRST. PPI 154 is also coupled to the service switch as shown.

PPI 156 receives data input D0–D7, and receives signals A0, A1, $\overline{RD}$, $\overline{WR}$ and $\overline{CS}$, as shown. PPI 156 provides the following signals: service LED and test out. PPI 156 receives fourteen sold-out/vend signals from AC translators, four logic level spare signals, an exact change signal and a coined signal.

UART 148 provides an interrupt signal INT2. UART 148 receives data signals D0–D7, and receives signals A0–A2, $\overline{RD}$, $\overline{WR}$ and CS2. A clock 230 is coupled to UART 148, as shown. UART 148 is coupled to interface 150 and the second serial port 234.

UART 144 receives data signals D0–D7 and receives signals A0–A2. UART 144 also receives signals $\overline{RD}$, $\overline{WR}$ and CS2. UART 144 provides in interrupt signal INT1 and is coupled to clock 232. UART 144 is coupled to interface 146 which is coupled to the second serial port 236.

A/D converter 152 receives a DC reference voltage from reference generator 238. A/D converter 152 also receives data signals D0–D7, and signals A0–A2. A/D converter 152 receives the following additional signals: ADCLK, BATT-VOLT, BATTEMP and BOXTEMP. A/D converter 152 provides the interrupt signal INT0, as shown.

Memory Bus

Figure 11:
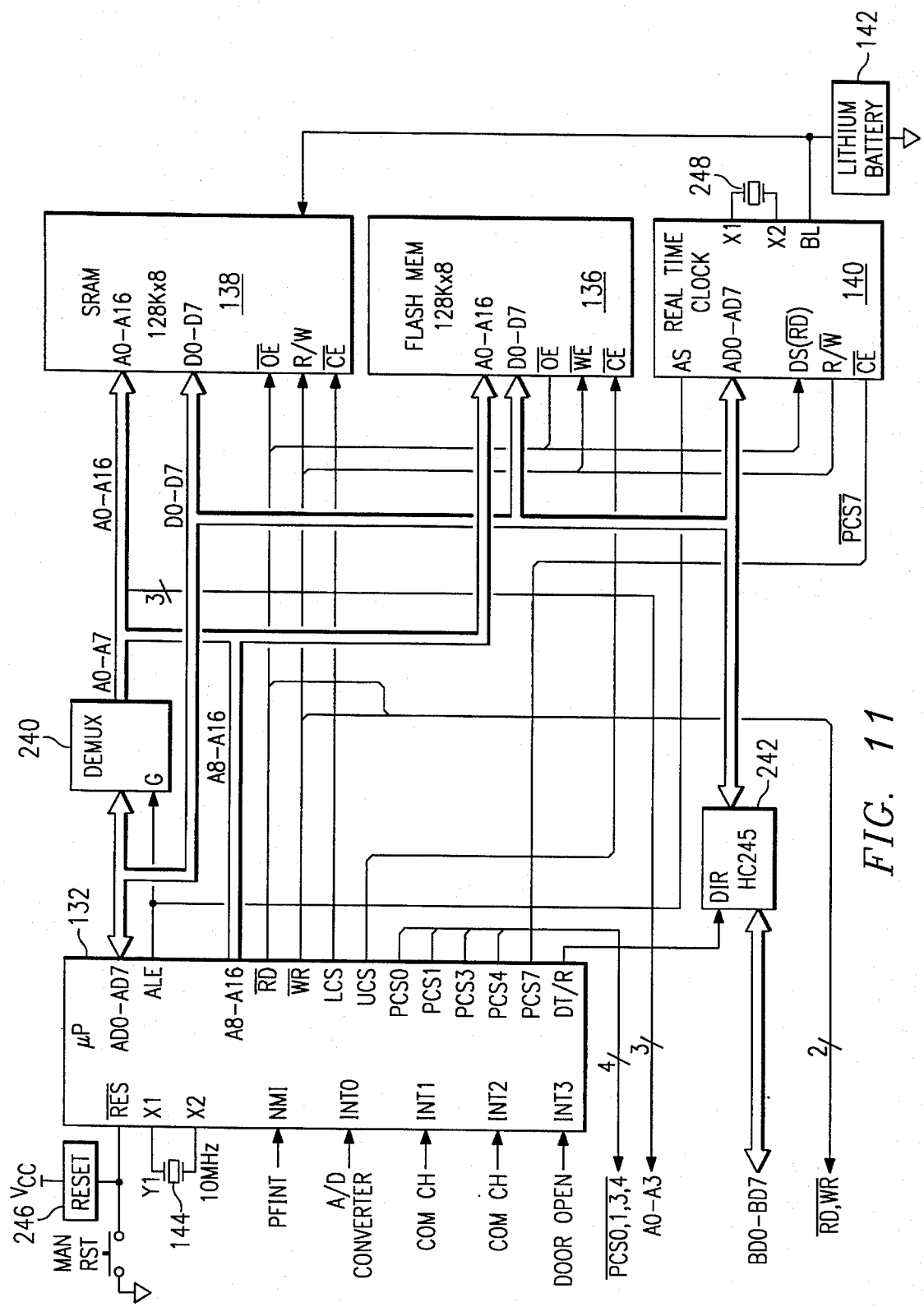
FIG. 11 is a block diagram of one embodiment of the memory signals of the system controller memory bus of FIG. 7.

FIG. 11 illustrates the memory bus of system controller 102 of FIG. 7. Microprocessor 132 is coupled to demultiplexer 240, SRAM 138, flash memory 136 and real time clock 40. Microprocessor 132 receives input signals and provides output signals, as shown. Microprocessor 132 receives interrupt signals PFINT, INT0, INT1, INT2, INT3. SRAM 138, flash memory 136 and real time clock 140 receive data and control signals, as shown. A clock 248 is coupled to real time clock 140.

Overview of Controller Subsystem Software

The operation of controller subsystem 34 of FIG. 2 is controlled by controller 26 running software modules. The operation of the dispensing unit is described in more detail below.

Initialization

Upon power-up on cold-start, micro-processor memory addressing circuitry is initialized to assign 64k of static RAM in the SRAM to absolute system address "00000." The real-time clock is assigned to absolute system address "08000." The flash program memory is assigned to absolute system address "E0000." An interrupt service routine vector table is copied from the flash memory to the bottom of static RAM. Finally, the tri-color service LED, which is "off" at power-up, is turned "red." Control is passed to memory initialization routines which set up a system stack and data areas. A main controller application process is then executed.

The main controller process performs initialization routines. A dispensing unit database is initialized to hard-coded values. A clock for the A/D controller is started. Both serial communications port controllers are initialized. Both parallel port controllers are initialized. The real-time clock is initialized. A "cold-start" command is placed in the command queue. The tri-color LED is turned "yellow," and interrupts are enabled.

The controller process checks for the presence of a diagnostic device on the second serial port. If a diagnostic device is present, such as a printer or video display terminal, the controller process enters a diagnostic mode. In diagnostic mode, the controller process displays on the diagnostic device the current controller status, including the controller serial number, controller time, and date. The status of AC power, door switch, service switch, exact change, coined, temperature, and battery voltage are displayed. Finally, the status, depressed or released, of the "stock-out" and "reference" sensors are displayed. If the status of any of these sensors is changed, the diagnostic status lines are again displayed, reflecting the change in switch status. The controller process remains in the diagnostic mode as long as a diagnostic device is connected. The controller can be placed back into diagnostic mode at any time by connecting the diagnostic device. Bin data and history are unaffected while the controller process is in the diagnostic mode.

Initialization commands are issued to the radio-modem connected to the primary serial communications port. The controller process proceeds no further until the modem has been initialized successfully. Once the modem is correctly configured, the controller process starts a command queue processing loop.

The cold-start command is retrieved from the command queue and executed. The cold-start process captures the current state of the parallel ports. The various software timers, decremented by the real-time clock interrupt service routine are initialized to zeros. The controller process formats and transmits a "cold-start" message to the dispensing unit controller system through the communications network. The controller process then resumes the command queue loop.

The controller process requires two initialization messages from the dispensing unit controller system for correct operation. Upon receipt of the first type of message, a "system initialization" message, appropriate "system" data fields in the controller are updated. The tri-color LED is then turned "green." The next required message is the "bin initialization" message, which contains bin inventory references and reorder reference points.

Real-Time Clock Interrupt Service Routine

The main processing loop of the controller process monitors the command queue for any requested function commands. No function is allowed to monopolize system resources. Any function currently in process is interrupted as necessary by the various interrupting sources. A real-time clock interrupt service routine is responsible for placing commands in the command queue.

The real-time clock interrupt service routine performs various tasks. System time and date fields are updated from the real-time clock controller. A clock "tick" counter is incremented and is used to determine when various count-down timers will be decremented. The expiration of any given count-down timer results in a related process command being placed in the command queue.

A door, power-fail, parallel port, and transmitted message timers are decremented on one-second intervals. If the door timer expires, a "door change" command is placed in the command queue. If the power timer expires, a "power change" command is placed in the command queue. If any transmitted message timers expire, a "retry transmission" command is placed in the command queue. The parallel port timers, one for each bit of each port, eight timers per port, do not queue any commands. The port timers are used by a "scan ports" routine.

Once each minute, the most recent machine temperature is compared to the downloaded thresholds if temperature monitoring is selected. If the machine temperature is outside the thresholds, the temperature check interval timer is expired, and the current temperature has not moved back towards the established thresholds, an "over temp" or "under temp" command is placed in the command queue.

The controller process monitors vending activity to detect a period of inactivity. A vend activity timer is decremented once an hour. Upon reaching zero, a "no vends" command is placed in the command queue. The vending activity timer is reset to a downloaded parameter upon each vend and when the door is closed after servicing.

At midnight each day, a history upload timer is loaded with a number of minutes the dispensing unit must wait to queue a "history upload" command. The number of minutes to wait is derived as a function of the dispensing unit's identification number. This technique prevents all of the dispensing unit controllers from transmitting history data at the same time.

Access to the A/D controller is governed by a fractional-second timer. Timeout is set at one-half second. Five of the eight A/D channels of the A/D converter are used. Channel one is the box temperature. Channel two is the battery temperature. Channel three is the battery voltage. Channels four and five are power supply status. The value from the current channel is read and the next channel is "started." Two point five seconds are required to start and read all five channels.

There are two one-half second interval received character timers. The timers are activated when a character is received from their respective serial communications ports. When either received character timers expires, a "message received" command is placed in the command queue. The final task of the real-time clock interrupt service routine is to queue a "scan ports" command every one-half second.

Processing the Command Queue

The controller process resumes the command processing loop after each interrupt. The controller processor waits for, then fetches commands sequentially from the command queue. A command processing routine will execute the appropriate subroutine, transmitting, as necessary, a status message to the dispensing unit controller system. If a transmission is in progress, as indicated by a transmit busy flag, the just-fetched command is placed back into the queue.

The following commands trigger the transmission of a status message: cold-start, machine status, door change, power change, exact change, no vends, under temp, over temp, bad RTC battery, bin status, stock out, and upload history. The tasks performed by the aforementioned routines are detailed below.

The cold-start routine clears the count-down timers and other working storage data areas. The bin database is initialized using the inventory values stored in the "system data." An "update upload record" routine is executed. The update upload record routine extracts data from the system data and bin database, converting that data to the upload format in preparation for transfer to the dispensing unit controller system. A "transmit message" routine is then executed. The machine status routine executes the update upload record and transmit message routines.

The door change routine first determines whether the door is open or closed using a flag updated by a door change interrupt service routine. If the door is open, the routine checks the service switch flag. If the service switch is "on," then exact change status flag is turned "off." If the door is closed, the service switch flag, the communications retry counter, and the activity timer are reset. Finally, the update upload record and transmit message routines are executed. The power change, exact change, no vends, under temp, over temp, and bad RTC battery routines also execute the update upload record and transmit message routines.

The bin status and stock out routines also execute the update upload record and transmit message routines. The "stock message sent" flag is also set. The upload history routine executes the update upload record with bin history appended to the upload record. The transmit message routine is executed.

The remaining commands do not cause the format and transmission of status messages: scan ports, get received message, retry transmission, and disconnect. The scan ports routine first captures the current bit status from the two parallel port controllers. There are twenty-four bits per controller. The current port status is compared to a saved port status. A change in port status triggers additional processing.

The bin out-of-stock level sensors comprising "stock-out" flapper switches are checked first. A change in a bin stock-out flapper switch is detected by comparing the current port bit status to a "save" port bit status. Upon a bit change, if the door is closed, the flapper switch is released, and the coin changer is in a "coined" status, the controller process executes the bin status routine. The switch status is latched for switch "debounce" purposes and a stock-out timer for the affected bin is activated. The "coined" status is cleared. If the flapper switch is in the depressed (stock present) position and the door is closed, the bin "latch" and stock-out timer are cleared. Finally, the current bit status is moved to the "save" bit status.

The bin reference level sensors comprising "reference" flapper switches are checked next. A change in a reference flapper status causes the current switch state to be recorded in the bin database. If the door is open, the service switch "on" and the flapper is depressed, the bin status, inventory, and vend count for the specific bin are reset.

The service switch is also checked and its state captured. The port containing the "coined" and "exact change" bits is examined next. If the exact change bit is active and the exact change status flag has not been set, then the exact change status flag is set and the "exact change" command is placed in the command queue. If the coined bit is active, the coined status flag is set.

Finally, expiration of the bin stock-out timers is checked. Active stock-out timers are decremented once a second by the real-time clock interrupt service routine. If a ten-second time-out has expired, a stock-out status was "latched" by the bin change code, and the bin has not previously been flagged as "stock out," the "stock out" routine is executed. The bin stock-out status is then set and the bin change latch is cleared.

When the AC power to the controller either fails or is restored, a power-fail interrupt service routine is executed. The AC power status is captured and a "power change" command is placed in the command queue. Upon execution of the power change routine after an AC power loss, the controller transmits a "power-loss" message, shuts down power to the modem, then halts the processor. If the door is opened while power is off, the controller process will power up the modem and send a "door open" message. When AC power is restored, the controller will power up all systems and transmit a "power restored" message.

When the dispensing unit door is either opened or closed, a door-change interrupt service routine is executed. The door status is captured and the door change timer is activated using the downloaded door timeout interval. The real-time clock interrupt service routine will decrement the door change timer once a second. When the timeout expires, a "door change" command is placed in the command queue. A change in the "door switch" will generate an interrupt to the controller. If the controller has been halted because of an AC power fail, a change in the door switch state will restart the controller processor. The "door switch" interrupt service routine will place a "door open/closed" command in the command queue and terminate.

Controller Software Bin Database

The controller of each dispensing unit maintains a bin database. The bin database contains two data sections:

inventory and history. The inventory section contains the following data fields for each bin: bin status, reference switch flag, reference level, maximum reorder level, minimum reorder level, inventory quantity, vend count, and total vend count. The history section contains the vend count for each bin for twenty-four separate periods. The number of bins, reference level, maximum reorder level, and minimum reorder level are downloaded by the dispensing unit controller system. Bin status, inventory quantity, vend count, and total vend count are maintained by the controller process.

There are several controller process routines that maintain the bin database. An initialize bin database routine initializes the original inventory reference and reference points to the bin database. The bin status, reference flapper flag, and vend counts are reset. An update bin database routine moves the downloaded inventory reference and reorder levels to the bin database. The bin status routine restarts the vend timer using a downloaded interval. The total vend count for the current bin is incremented. The vend history count for the current period and bin is incremented. If the bin stock level is above the reference level, as indicated by the bin reference flapper flag, the bin vend count is incremented and the bin inventory level is unchanged. If the bin stock level is below the reference level, the bin inventory level is decremented and the vend count is unchanged.

Once the reference level is crossed, the dispensing unit controller system can determine the quantity of product sold. The quantity sold is the sum of the number of vends after the reference level plus the vend count prior to crossing the reference level. The number of vends after the reference level is the difference between the downloaded reference level and the current bin inventory level.

After the bin inventory level is decremented, the bin status flag is, if necessary, changed. The value of the bin status flag varies depending upon the bin inventory level and the downloaded inventory reference/reorder levels. If the bin status flag is changed and one of the following conditions occur, a bin status command is placed in the command queue. When the inventory message control flag is set to "no additional messages," only the first bin to reach an out-of-stock condition will cause a "low stock" message to be sent to the dispensing unit controller system. When the inventory message control flag is set to "additional messages when out of stock," a "low stock" message is sent to the dispensing unit controller system as each bin reaches an out-of-stock level. When the inventory message control flag is set to "additional messages when at minimum reorder," a "low stock" message is sent to the dispensing unit controller system as each bin reaches the downloaded minimum reorder level or an out-of-stock level. When the inventory message control flag is set to "additional messages at any level," a "low stock" message is sent to the dispensing unit controller system as each bin reaches the downloaded reference level, maximum reorder level, minimum reorder level, or an out-of-stock level.

The stock out routine is executed if the bin stock-out flapper switch remains in the released position after the bin stock-out timer expires. The bin status flag is set to "empty" and the bin inventory level is set to zero. Unless the inventory message control flag is set to "no additional messages," and a stock-out message has previously been sent, a "stock-out" command is placed in the command queue.

Communication of Messages

Communication routines perform the exchange of data between command processing routines and the communication drivers. The controller processor is used to sequence the appropriate routines to send and receive messages. The communication drivers are protocol-sensitive routines that are responsible for the network-required formatting surrounding the communication of messages and placing sequence commands in the command queue.

The communication routines are responsible for interfacing to an "intelligent" coin mechanism, if installed, in the dispensing unit. The controller communicates to the coin mechanism using the appropriate protocol, typically DEX/UCS. The received coin mechanism data is formatted into "coin changer" upload records and transmitted to the dispensing unit controller system.

Communications of messages between the dispensing unit and the dispensing unit controller system occur in both directions. The sending unit receives positive conformation that the message was received for all transmissions. The controller process uses check-summed data with an "ACK/NAK" protocol independent of the existing network error-checking. A packet block count and maximum block count are provided to allow the assembly of multiple-packet messages.

Low-level communication routines are interrupt-driven. Upon a received character available interrupt, the controller process executes the communications interrupt service routine. The interrupt service routine collects characters from the interrupting communications port and places them in a circular character queue.

A received character timer is initialized upon receipt of each character. The received character timer is decremented by the real-time clock interrupt service routine. Timeout of the received character timer signifies that a complete message has been received. A "get message" command is placed in the command queue.

Upon a transmitter buffer empty interrupt, the controller process executes the communications interrupt service routine. The communications interrupt service routine takes the next character, if any, from the transmit buffer and outputs that character to the appropriate communications port. A change in the status of the "carrier detect" line causes the controller process to execute the communications interrupt service routine. A "connected" status flag is updated to reflect the current state of the carrier detect signal.

There are three major communication functions: initialize the modem, process a received message, and transmit an outgoing message. The initialize modem routine is executed upon cold-start. Initialization commands are sent to the modem. The number and content of these commands is dependent upon the modem's specific requirements. The main controller application process will not start until the modem is ready for service.

The received message routine is executed by the controller process when the "get message" command is retrieved from the command queue. All the received characters are copied from the received character queue to a temporary work area. The first character of the message is examined and acted upon as follows. When an "acknowledge" character (ACK) is received, the packet counter is, if active, decremented. If additional packets remain to be transmitted, a "transmit message" command is queued. If the packet counter is zero, a "disconnect" command is queued if the "connected" flag is set. If a "not acknowledged" character (NAK) is received, a "retry transmission" command is queued. If the modem "ok" character (0) or "no carrier" character (3) is received, the "connected" flag is cleared. If the modem "connect" character (1) is received, the "connected" flag is set. If additional characters follow the connect character, those characters are examined until a "start of header" character (SOH) is found. The SOH and the remaining received characters constitute the received message from the host.

After a SOH character is received, a check-sum is calculated using the received data. The calculated check-sum is compared to the transmitted check-sum contained in the message preamble. If the check-sums do not match, a NAK is immediately transmitted back to the dispensing unit controller system. When check-sums match, the data portion of the message is copied to a large buffer used to assemble multiple-packet messages. An ACK is transmitted to the dispensing unit controller system. Processing continues after the last packet is received. If the current block number is equal to the maximum number of blocks, then the last packet has been received. The first packet in the large message-assembly buffer contains the message type code.

The received message is processed according to the message type. A "system reset" code queues a "cold-start" command. A "system initialization" code moves the contents of the received message to the system data record. A "bin initialization" code moves the contents of the received message to the bin database. If the service switch is "on," the bin database is initialized to the downloaded inventory levels. Vend counts are zeroed. If the service switch is "off," only the inventory reference and reorder levels are affected.

A "status request" code queues a "machine status" command. A "time initialization" code will change the time and date contained in the real-time clock controller to the downloaded time and date. A "download program" code causes the controller process to execute the update program routine. The update program routine first performs a check-sum upon each line of the received message. The calculated check-sum is compared to the transmitted check-sum which is appended to the end of each line. If the check-sums do not match, the downloaded application is discarded. If the check-sums match, the existing application is over-written with the downloaded application. The controller is cold-started. At the conclusion of the received message routine and if the cold-start status flag is set, the tri-color LED is changed to "green" from "yellow." The cold-start flag is reset.

The transmit message routine is executed by the controller process when the "transmit message" command is retrieved from the command queue. If the "connected" flag is cleared, the "dial host" routine is executed. When "connected," the transmit busy flag is set to prevent new transmit commands to be initiated. A zero in the packet flag indicates to the routine to format the first packet. The upload message buffer is cleared for the first packet. The upload data record and the upload bins record are copied to the upload message assembly area. If bin history is to be included in the current transmission, bin history data is copied to the upload message buffer as well. The number of packets necessary to transmit the entire message is calculated and saved in the packet flag and maximum block count in the message preamble.

A packet-sized block of the upload message is copied to the transmit buffer. The check-sum is calculated. The transmit timer is initialized to ten seconds. The transmit retry counter is initialized to the downloaded communications retry count. Transmit interrupts are turned on thus transmitting the message to the dispensing unit controller system. The retry transmit routine is executed by the controller process when the "retry transmit" command is retrieved from the command queue. The transmit retry counter, if non-zero, is decremented. The transmit timer is initialized back to ten seconds. The communications retry counter is incremented. The contents of the transmit buffer are unchanged. Transmit interrupts are turned on thus retransmitting the message to the host. If the transmit retry counter is zero, the "disconnect" command is placed in the command queue. The current upload message is then discarded.

The dial host routine establishes a connection to the dispensing unit controller system via the modem. The "dial" command is repeated on thirty-second intervals until the connection is completed or the retry counter is zeroed. The "connected" flag is set when connection to the communication network is completed. The disconnect routine breaks the connection to the dispensing unit controller system via the modem. The disconnect command is repeated on five-second intervals until the connection is broken or the retry counter is zeroed. The "connected" flag is cleared when the connection to the radio network is idled.

Summary and Overview

A system for managing multiple dispensing units constructed according to the teachings of the present invention provides numerous technical advantages. One technical advantage of the present invention is the acquisition of information in an event-driven real-time mode. This provides accurate information as to the status of each dispensing unit. Another technical advantage is the ability to download parameters and software modules into dispensing units to modify the operation of the dispensing units. A further technical advantage of the present invention is the provision of inventory groups and polling groups that increase the efficiency of restocking and repairing dispensing units. Other technical advantages of the present invention are the use of a communication log for messages communicated in the system and the ability to activate and deactivate sales history monitoring and reporting. It is a further technical advantage of the present invention that various reports and service schedules can be generated automatically based upon the event-driven real-time information acquired from dispensing units.

Although the present invention has been described in detail, it should be understood that various changes, substitutions and alterations can be made hereto without departing from the spirit and scope of the invention as defined in the appended claims.

What is claimed is:

1. A system for managing multiple dispensing units by communicating information through a communications network, the system comprising:

a plurality of dispensing units operable to transmit and receive information through the communications network, each dispensing unit comprising;

a plurality of bins each operable to hold a quantity of product;

a plurality of reference level sensors, each reference level sensor coupled to an associated bin, and each reference level sensor operable to determine when the quantity of product in the associated bin drops below a reference level that is higher than an out of stock level of the associated bin; and a controller subsystem coupled to the plurality of bins, to the plurality of reference level sensors and to the communications network, the controller subsystem operable to monitor conditions of the dispensing unit, to transmit status messages responsive to an occurrence of one of a plurality of defined events, and to receive command messages; and a dispensing unit controller system operable to communicate through the communications network, the dispensing unit controller system operable to receive status messages from each of the plurality of dispensing units, to process the status messages, and to transmit command messages to each of the plurality of dispensing units, wherein one command message comprises an instruction to a dispensing unit to download a software module to update an existing software module in the controller subsystem of the dispensing unit.

2. The system of claim 1, wherein the dispensing unit controller system is further operable to transmit a command message instructing a dispensing unit to download a plurality of parameters.

3. The system of claim 1, wherein:

at least one dispensing unit further comprises a dispensing unit controller subsystem coupled to the controller subsystem of the at least one dispensing unit;

the dispensing unit controller subsystem operable to receive and process status messages from a subset of dispensing units and to transmit command messages to the subset of dispensing units;

such that the at least one dispensing unit provides an interface between the subset of dispensing units and the dispensing unit controller system.

4. The system of claim 1, wherein the dispensing unit controller system divides the plurality of dispensing units into separate inventory groups, each inventory group comprising a plurality of dispensing units combined together to form a virtual dispensing unit having a virtual stock that is a combination of stock in all dispensing units in the inventory group.

5. The system of claim 1, wherein the dispensing unit controller system divides the plurality of dispensing units into separate polling groups, each polling group comprising a plurality of dispensing units grouped together for servicing.

6. The system of claim 1, wherein the dispensing unit controller system is operable to transmit a command message instructing a dispensing unit to activate sales history information acquisition and a command message instructing a dispensing unit to deactivate sales history information acquisition.

7. The system of claim 1, wherein the dispensing unit controller system is operable to maintain a communication log for receiving status messages from and transmitting command messages to the plurality of dispensing units.

8. The system of claim 1, wherein the dispensing unit controller system is operable automatically to generate reports and service schedules based upon information provided by status messages transmitted by the plurality of dispensing units.

9. The system of claim 1, wherein at least one dispensing unit in the plurality of dispensing units further comprises a data interface coupled to the controller subsystem, the data interface operable to monitor conditions of the at least one dispensing unit.

10. The system of claim 1, wherein the controller subsystem of each dispensing unit is operable to monitor the quantity of product in the plurality of bins, and wherein one of the plurality of defined events comprises a reference level sensor determining that the quantity of product in an associated bin has dropped below the reference level.

11. A dispensing unit, comprising:

a plurality of bins each operable to hold a quantity of product;

a plurality of reference level sensors, each reference level sensor coupled to an associated bin, and each reference level sensor operable to determine when the quantity of product in the associated bin drops below a reference level that is higher than an out of stock level of the associated bin; and a controller subsystem coupled to the plurality of bins and to the plurality of reference level sensors, the controller subsystem operable to monitor conditions of the dispensing unit, to transmit status messages through a communications network responsive to an occurrence of one of a plurality of defined events, and to receive command messages from the communications network, wherein one command message comprises an instruction to the dispensing unit to download a software module to update an existing software module in the controller subsystem of the dispensing unit, and wherein one of the plurality of defined events comprises a reference level sensor determining that the quantity of product in an associated bin has dropped below the reference level.

12. The dispensing unit of claim 11, wherein the controller subsystem comprises:

a controller operable to process information describing monitored conditions of the dispensing unit;

a communication interface coupled to the controller; and a plurality of status sensors coupled to the controller, each status sensor operable to monitor conditions of the dispensing unit.

13. The dispensing unit of claim 12, wherein the controller subsystem further comprises a data interface coupled to the controller subsystem, the data interface operable to monitor conditions of the dispensing unit.

14. The dispensing unit of claim 13, wherein the data interface comprises a coin mechanism having a DEX/UCS port.

15. The dispensing unit of claim 12, wherein the controller subsystem further comprises a user interface coupled to the controller.

16. The dispensing unit of claim 15, wherein the user interface is selected from the group comprising a light wand, keypad, display device, and scanner.

17. The dispensing unit of claim 12, wherein the plurality of status sensors comprise a plurality of AC level translators.

18. A retrofit kit for installation in a dispensing unit having a plurality of bins, each bin operable to hold a quantity of product, the retrofit kit comprising:

a controller operable to process information representing monitored conditions of the dispensing unit;

a communication interface coupled to the controller;

a plurality of reference level sensors coupled to the controller, each reference level sensor operable to couple to an associated bin and further operable to determine when a quantity of product in the associated bin drops below a reference level that is higher than an out of stock level of the associated bin; and a plurality of status sensors coupled to the controller, each status sensor operable to monitor conditions of the dispensing unit;

wherein each of the plurality of bins comprises a serpentine bin and each of the plurality of reference level sensors is operable to sense the quantity of product with respect to the reference level of the associated bin; and wherein at least one reference level sensor comprises:

a spacer;

a fastening means operable to extend through a drilled hole in a plastic flange proximate the associated bin and to couple the spacer to the plastic flange; and a mechanical actuator coupled to the spacer and having a trigger, the mechanical actuator operable to generate a signal responsive to movement of the trigger caused by product in the associated bin dropping below the reference level.

19. A retrofit kit for installation in a dispensing unit having a plurality of bins, each bin operable to hold a quantity of product, the retrofit kit comprising:

a controller operable to process information representing monitored conditions of the dispensing unit;

a communication interface coupled to the controller;

a plurality of reference level sensors coupled to the controller, each reference level sensor operable to couple to an associated bin and further operable to determine when a quantity of product in the associated bin drops below a reference level that is higher than an out of stock level of the associated bin; and a plurality of status sensors coupled to the controller, each status sensor operable to monitor conditions of the dispensing unit;

wherein each of the plurality of bins comprises a serpentine bin and each of the plurality of reference level sensors is operable to sense the quantity of product with respect to the reference level of the associated bin; and wherein at least one reference level sensor comprises:

a spacer;

a fastening means operable to span an existing hole in a plastic flange proximate the associated bin and to couple the spacer to the plastic flange; and a mechanical actuator coupled to the spacer and having a trigger, the mechanical actuator operable to generate a signal responsive to movement of the trigger caused by product in the associated bin dropping below the reference level.

20. A method of managing multiple dispensing units, comprising the steps of:

positioning a plurality of reference level sensors in each dispensing unit such that each reference level sensor is operable to determine when a quantity of product in an associated bin drops below a reference level that is higher than an out of stock level of the associated bin;

defining a plurality of triggering events, wherein one of the plurality of triggering events comprises a reference level sensor determining that the quantity of product in an associated bin has dropped below the reference level;

monitoring conditions of a plurality of dispensing units;

transmitting a command message to at least one dispensing unit, wherein the command message instructs the at least one dispensing unit to download software to update existing software in a controller subsystem of the at least one dispensing unit;

determining for each dispensing unit when the conditions of the dispensing unit indicate a triggering event has occurred;

transmitting a status message from each dispensing unit to a central facility through a communications network responsive to an occurrence of a triggering event with respect to the dispensing unit;

collecting status messages from the plurality of dispensing units at the central facility;

processing the status messages to generate restocking and repair orders for the plurality of dispensing units.

21. The method of claim 20, further comprising the step of transmitting, prior to the step of processing, a command message to at least one dispensing unit, wherein the command message requests a current status of the at least one dispensing unit.

22. The method of claim 21, wherein the command message is transmitted to each dispensing unit in an inventory group, each inventory group comprising a plurality of dispensing units combined together to form a virtual dispensing unit having a virtual stock that is a combination of stock in all dispensing units in the inventory group.

23. The method of claim 21, wherein the command message is transmitted to each dispensing unit in a polling group, each polling group comprising a plurality of dispensing units grouped together for servicing.

24. The method of claim 20, further comprising the step of transmitting, prior to the step of determining, a command message to at least one dispensing unit, wherein the command message instructs the at least one dispensing unit to download parameters redefining the plurality of triggering events.

* * * * *